(12) United States Patent
Bodiya et al.

(10) Patent No.: US 11,314,092 B2
(45) Date of Patent: Apr. 26, 2022

(54) SYSTEMS, DEVICES, AND METHODS FOR LIGHT GUIDE BASED WEARABLE HEADS-UP DISPLAYS

(71) Applicant: GOOGLE LLC, Mountain View, CA (US)

(72) Inventors: Timothy Paul Bodiya, Toronto (CA); Shreyas Potnis, Kitchener (CA)

(73) Assignee: Google LLC, Mountain View, CA (US)

( * ) Notice: Subject to any disclaimer, the term of this patent is extended or adjusted under 35 U.S.C. 154(b) by 203 days.

(21) Appl. No.: 16/738,206

(22) Filed: Jan. 9, 2020

(65) Prior Publication Data

US 2020/0225482 A1 Jul. 16, 2020

Related U.S. Application Data

(60) Provisional application No. 62/946,705, filed on Dec. 11, 2019, provisional application No. 62/943,381, filed on Dec. 4, 2019, provisional application No. 62/910,124, filed on Oct. 3, 2019, provisional application No. 62/904,742, filed on Sep. 24, 2019, provisional application No. 62/846,979, filed on May 13, 2019, provisional application No. 62/791,514, filed on Jan. 11, 2019.

(51) Int. Cl.
*G02B 27/01* (2006.01)
*G02B 6/42* (2006.01)
*G02B 27/09* (2006.01)

(52) U.S. Cl.
CPC ....... *G02B 27/0172* (2013.01); *G02B 6/4204* (2013.01); *G02B 27/0944* (2013.01); *G02B 2027/0187* (2013.01); *G02B 2027/0194* (2013.01)

(58) Field of Classification Search
CPC .............. G02B 6/4204; G02B 27/0172; G02B 27/017; G02B 27/0176; G02B 27/01; G02B 27/0101; G02B 2027/0178; G02B 2027/0187; G02B 2027/0194
USPC .......................................................... 359/13
See application file for complete search history.

(56) References Cited

U.S. PATENT DOCUMENTS

| | | | | |
|---|---|---|---|---|
| 10,386,642 | B2* | 8/2019 | Piskunov | G02B 6/34 |
| 10,509,241 | B1* | 12/2019 | Robbins | G02B 26/0808 |
| 2006/0221448 | A1* | 10/2006 | Nivon | G02B 27/4216 |
| | | | | 359/572 |
| 2010/0277803 | A1* | 11/2010 | Pockett | G02B 27/4205 |
| | | | | 359/567 |
| 2017/0235144 | A1* | 8/2017 | Piskunov | G02B 5/32 |
| | | | | 359/13 |
| 2018/0129058 | A1* | 5/2018 | Morrison | G02B 5/32 |
| 2018/0292592 | A1* | 10/2018 | Danziger | G02B 6/34 |
| 2019/0129180 | A1* | 5/2019 | Mohanty | H01J 27/022 |
| 2021/0109347 | A1* | 4/2021 | Blomstedt | G06F 1/1607 |

* cited by examiner

*Primary Examiner* — William R Alexander

(57) ABSTRACT

Systems, devices, and methods for light guide based wearable heads-up displays ("WHUD") are described. Display uniformity may be improved via incoupler double bounce uniformity or eyebox mapping. Grating cosmetic effects may be reduced. FOV may be enhanced by multiple EPEs. Bandwidth may be increased by laser wavelength offsets. The couplers may be a single contiguous photopolymer.

20 Claims, 16 Drawing Sheets

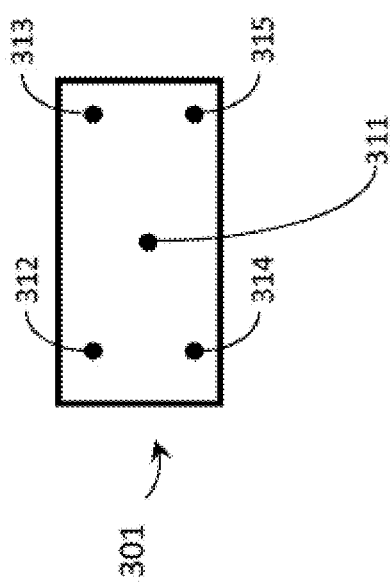
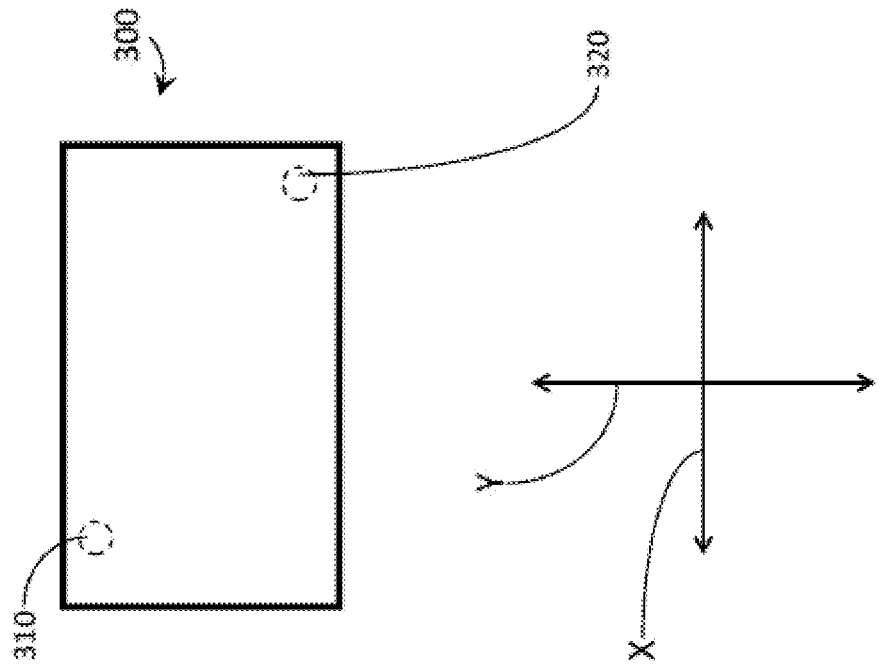

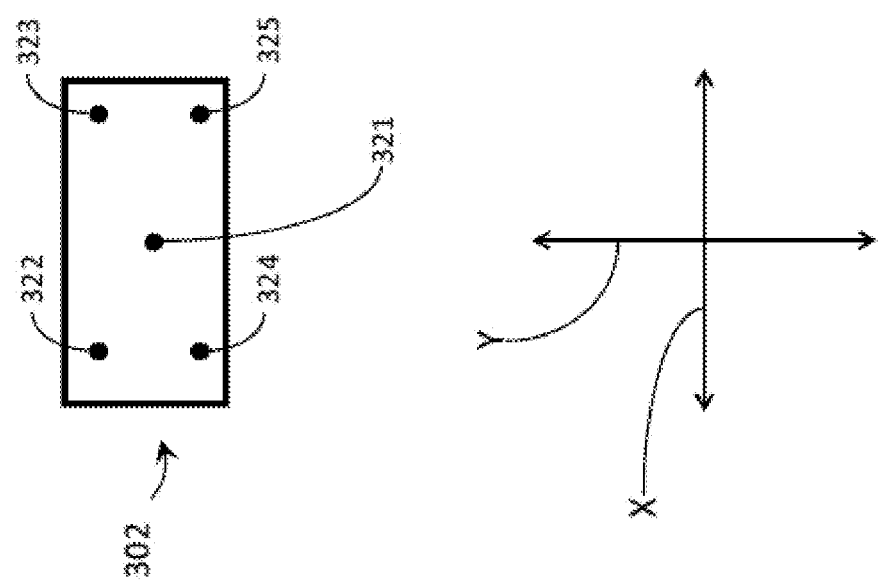

SYSTEMS, DEVICES, AND METHODS FOR LIGHT GUIDE BASED WEARABLE HEADS-UP DISPLAYS

CROSS REFERENCE TO RELATED APPLICATIONS

This application claims the benefit of the following applications, the content of each of which is incorporated by reference herein in their entirety:

U.S. Provisional Patent Application No. 62/791,514, filed Jan. 11, 2019, titled "Systems, Devices, and Methods for Light Guide Based Wearable Heads-Up Displays"

U.S. Provisional Patent Application No. 62/846,979, filed May 13, 2019, titled "Single RGB Combiner with Large Field of View"

U.S. Provisional Patent Application No. 62/904,742, filed Sep. 24, 2019, titled "Displays and Methods of Operating Thereof"

U.S. Provisional Patent Application No. 62/910,124, filed Oct. 3, 2019, titled "Displays and Methods of Operating Thereof"

U.S. Provisional Patent Application No. 62/943,381, filed Dec. 4, 2019, titled "Optical Elements and Methods of Making the Same"

U.S. Provisional Patent Application No. 62/946,705, filed Dec. 11, 2019, titled "Optical Elements for Displays"

TECHNICAL FIELD

The present systems, devices, and methods generally relate to wearable heads-up displays and particularly relate to aligning diffractive optical elements and laser projectors.

BACKGROUND

Description of the Related Art

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display ("WHUD") is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date employ large display components and, as a result, most wearable heads-up displays presented to date are considerably bulkier and less stylish than conventional eyeglass frames.

A challenge in the design of wearable heads-up displays is to minimize the bulk of the face-worn apparatus will still providing displayed content with sufficient visual quality. There is a need in the art for wearable heads-up displays of more aesthetically-appealing design that are capable of providing high-quality images to the user without limiting the user's ability to see their external environment.

Laser Projectors

A projector is an optical device that projects or shines a pattern of light onto another object (e.g., onto a surface of another object, such as onto a projection screen) in order to display an image or video on that other object. A projector necessarily includes a light source, and a laser projector is a projector for which the light source comprises at least one laser. The at least one laser is temporally modulated to provide a pattern of laser light and usually at least one controllable mirror is used to spatially distribute the modulated pattern of laser light over a two-dimensional area of another object. The spatial distribution of the modulated pattern of laser light produces an image at or on the other object. In conventional laser projectors, the at least one controllable mirror may include: a single digital micromirror (e.g., a microelectromechanical system ("MEMS") based digital micromirror) that is controllably rotatable or deformable in two dimensions, or two digital micromirrors that are each controllably rotatable or deformable about a respective dimension, or a digital light processing ("DLP") chip comprising an array of digital micromirrors.

Light Guides in Wearable Heads-Up Displays

Many wearable heads-up displays employ light guide systems in the transparent combiner. A light guide can operate under the principle of total internal reflection (TIR). TIR occurs when light remains in a first medium upon incidence at a boundary with a second medium because the refractive index of the first medium is greater than the refractive index of the second medium and the angle of incidence of the light at the boundary is above a specific critical angle that is a function of those refractive indices. A light guide can also have surface treatments such as reflective metallization in order to reflect light to remain in the first medium. Light guides employed in wearable heads-up displays like those mentioned above can consist of rectangular prisms of material with a higher refractive index then the surrounding medium, usually air (Google Glass®, Optinvent Ora®, Epson Moverio®) or a planar lens (Microsoft Hololens®). Light input into the prism will propagate along the length of the prism as long as the light continues to be incident at boundaries between the prism and the surrounding medium at an angle above the critical angle. Light guides employ in-coupling and out-coupling elements to ensure that light follows a specific path along the waveguide and then exits the waveguide at a specific location in order to create an image that is visible to the user.

The optical performance of a wearable heads-up display is an important factor in its design. When it comes to face-worn devices, however, users also care significantly about aesthetics. This is clearly highlighted by the immensity of the eyeglasses (including sunglasses) frame industry. Independent of their performance limitations, many of the aforementioned examples of wearable heads-up displays have struggled to find traction in consumer markets because, at least in part, they lack fashion appeal. Most wearable heads-up displays presented to date employ planar waveguides in planar transparent combiners and, as a result, appear very bulky and unnatural on a user's face compared to the more sleek and streamlined look of typical curved eyeglass and sunglass lenses. In addition, light guides employed in wearable heads-up displays may suffer from a variety of optical defects due to the integration of the light guide into the wearable heads-up display. These optical defects may include seams at the edges of the light guide, diffraction of environmental light by the light guide, or display light that is not properly guided into the eye of the user, all of which may be visible to either the user or an outside observer.

There is a need in the art to integrate light guides in wearable heads-up displays or eyewear in order to achieve the form factor and fashion appeal expected of the eyeglass and sunglass frame industry without introducing optical defects into the lenses of the wearable heads-up display.

BRIEF SUMMARY

A light guide based wearable heads-up display may possess an increased field of view via the use of multiple laser light sources, or multiple exit pupil expanders. The uniformity of a light guide based wearable heads-up display may be increased by applying a brightness correction to the field of view based on an eyebox map. The outcoupler for a light guide based wearable heads-up display may be a two-dimensional exit pupil expander/outcoupler. The cosmetics of a surface-relief grating based light guide based wearable heads-up display may be improved. The incoupler, exit pupil expander, and outcoupler of a light guide based wearable heads-up display may be parts of a contiguous photopolymer material.

According to a broad aspect, the present disclosure describes an optical combiner comprising: a first grating to receive light and to redirect the light towards an eye of a user; and a second grating immediately adjacent the first grating, the second grating having a lower optical influence than the first grating.

The second grating may surround the first grating.

The optical combiner may further comprise a light guide which carries the first grating and the second grating, the light guide to receive light and to direct the received light to impinge on the first grating.

The first grating and the second grating may be surface relief gratings. The first grating and the second grating may be holographic gratings.

The first grating may have a higher grating efficiency than the second grating.

The optical combiner may further comprise a third grating immediately adjacent the second grating, the third grating having a lower optical influence than the second grating.

The first grating may have a grating angle which is different from a grating angle of the second grating.

The second grating may have a grating efficiency which decreases proportionally to distance from the first grating according to a gradient.

The second grating may cover an entire visible area of the optical combiner except for an area covered by the first grating.

The optical combiner may further comprise a third grating and a fourth grating adjacent the third grating, the third grating to receive light and redirect the received light towards the first grating, and the fourth grating having a lower optical influence than the third grating.

According to another broad aspect, the present disclosure describes a wearable heads-up display (WHUD) comprising: a light source to output display light; and an optical combiner comprising: a first grating to receive display light and to redirect the received display light towards an eye of a user; and a second grating immediately adjacent the first grating, the second grating having a lower optical influence than the first grating.

The optical combiner of the WHUD may further comprise: a third grating; a fourth grating immediately adjacent the third grating, the fourth grating having a lower optical influence than the third grating; and a fifth grating, wherein the fifth grating is to receive display light from the light source and redirect the display light from the light source towards the third grating, the third grating is to receive display light from the fifth grating and redirect the display light from the fifth grating towards the first grating, and the first grating is to receive display light from the third grating and redirect the display light from the third grating towards an eye of a user.

The WHUD may further comprise a support structure which includes a first arm, a second arm, and a front frame coupled to the first arm and the second arm, wherein the light source is carried by the first arm and the optical combiner is carried by the front frame.

The optical combiner of the WHUD may further comprise a light guide which carries the first grating and the second grating, the light guide to receive display light and to direct the received display light to impinge on the first grating.

The optical combiner of the WHUD may further comprise a third grating immediately adjacent the second grating, the third grating having a lower optical influence than the second grating.

The first grating may have a grating angle which is different from a grating angle of the second grating.

The second grating may have a grating efficiency which decreases proportionally to distance from the first grating according to a gradient.

The second grating may cover an entire visible area of the optical combiner except for an area covered by the first grating.

The first grating may have a higher grating efficiency than the second grating.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 3A is a schematic representation of an eyebox map.

FIG. 3B is a schematic representation of a first brightness correction map.

FIG. 3C is a schematic representation of a second brightness correction map.

DETAILED DESCRIPTION

Figure 1:
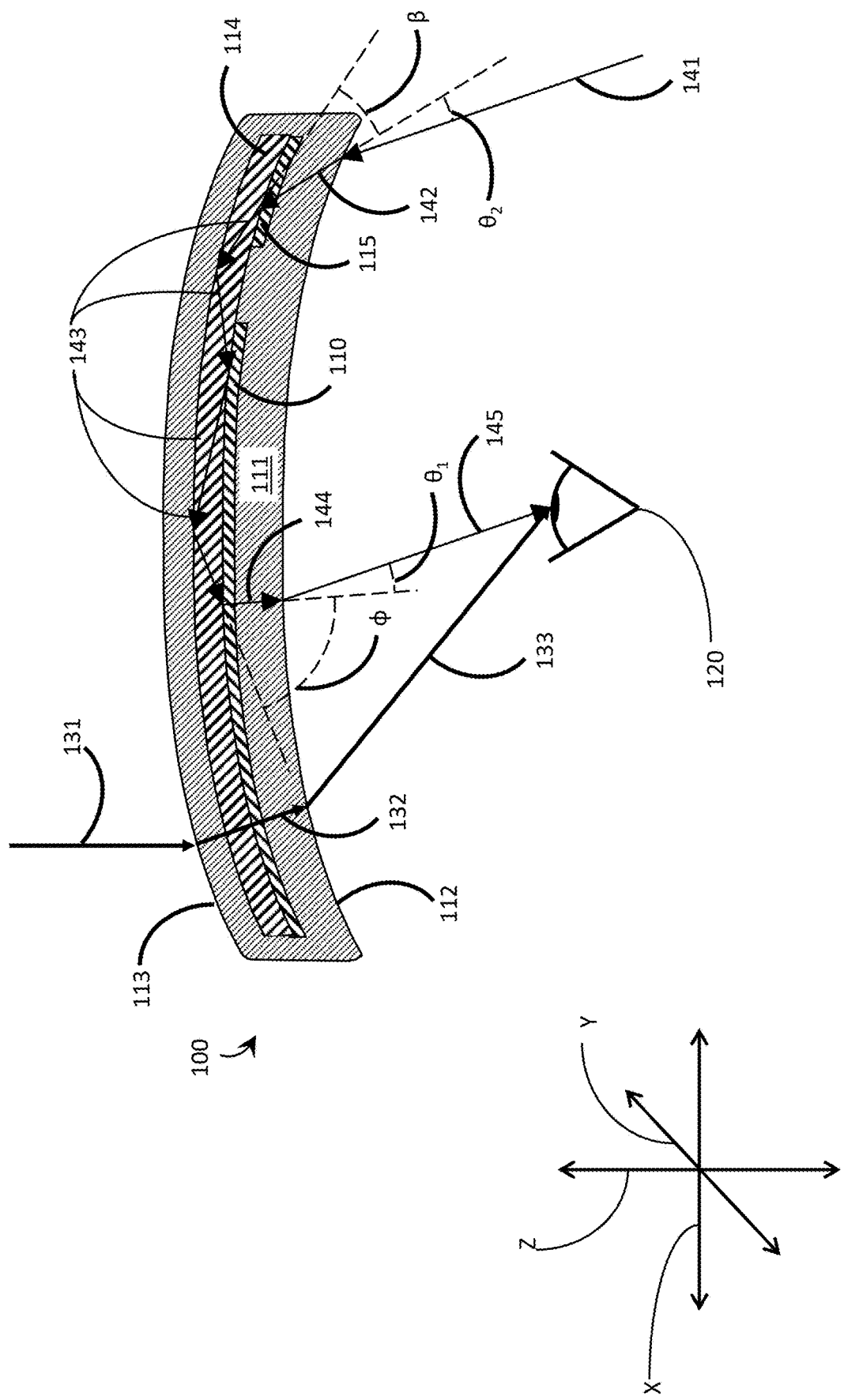
FIG. 1 is a cross-sectional view of an exemplary lens assembly suitable for use in light guide-based WHUDs in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for light guide based wearable heads-up displays and are particularly well-suited for use in wearable heads-up displays ("WHUDs").

Light Guides in Wearable Heads-Up Displays

Light-guide based displays operate by directing light from a light source through a light guide into an eye of a user. Non-exclusive examples of light sources include a scanning laser projector (SLP) and a microdisplay. A microdisplay comprises an array of pixels, where each pixel may emit light of a given color with variable intensity; the variation of intensity across the array produces an image. A SLP scans a beam of laser light across a field, where each point of the field comprises a pixel. An image is created by modulating (e.g. pulsing) the laser light as the field is scanned, providing a desired intensity of light for each pixel within the field. The following explanation describes the operation of a SLP, however a person of skill in the art will appreciate that a microdisplay does not "scan" across a field, rather a microdisplay may emit light across a field simultaneously, but apart from this fact the operation of a microdisplay-based WHUD is substantively similar to the operation of a SLP-based WHUD.

The light from the light source is scanned across an incoupler (IC). The IC directs the beam of laser light into a light guide, where the position and angle of the beam of laser light depends on the position of the pixel within the field at that point in the scan.

Light propagates through the light guide by bouncing off the interface between the light guide material (typically glass, may be plastic, high-index glass, or other optically transparent materials) and the material surrounding the light guide (typically air, may be other low refractive index materials) due to total internal reflection (TIR) at the interface. For a light guide oriented in the XY plane, propagation occurs in the XY plane; there is no net propagation in the Z direction, the light simply bounces back and forth between interfaces.

The beam of laser light propagates through an exit pupil expander (EPE) and then an outcoupler (OC). Each time the beam of light bounces onto the EPE, the EPE redirects a portion of the beam in a new direction. The light which is not redirected continues to propagate, forming new beams with each new bounce within the EPE. Each time the beam of light bounces onto the OC, the OC redirects a portion of the beam out of the light guide and into the eye of the user. The light which is not redirected continues to propagate, forming new beams with each new bounce within the OC.

The EPE and the OC in combination replicate the beam of laser light to form a grid of exit pupils (EPs), where each point in the grid is an individual EP. Accommodation by the eye causes the EPs entering the eye to overlap on a single spot on the retina; each pixel within the field thereby maps to a corresponding spot position on the retina.

When a user directs their gaze within the display, their pupil will move across a given area. So long as light from at least one EP is able to enter the pupil at its current position the user will be able to see the display; this area across which the pupil can move and the display is visible is called the eyebox. The grid of EPs formed by the EPE/OC combination creates a relatively large eyebox, creating a display with a relatively large field of view. The exit pupil spacing within the grid should be smaller than the size of the pupil to eliminate "dead zones" within the display, where a "dead zone" is an area within the nominal eyebox where the display is not visible; therefore light from multiple exit pupils will typically enter the pupil.

As the projector scans across the field, the angle at which light propagates within the light guide changes due to changes in the angle and/or position of light impinging on the IC. This causes the position and spacing of the EPs forming the grid of exit pupils to vary across the field, with additional variation in grid position and spacing between colors (RGB).

The IC, OC, and/or EPE typically comprise diffractive optical elements (DOEs). Non-exclusive examples of diffractive optical elements include a volume hologram, a volume diffraction grating, a surface relief diffraction grating, a transmission grating, or a reflection grating.

FIG. 1 is a cross-sectional view of an exemplary lens assembly 100 suitable for use in a light guide based WHUD in accordance with the present systems, devices, and methods. Lens assembly 100 comprises DOE 110, curved lens 111, light guide 114, and additional DOE 115. Lens assembly 100 may comprise at least one additional DOE substantively similar to DOE 110. DOE 110 is embedded within an internal volume of lens 111. Additional DOE 115 is embedded within an internal volume of lens 111. Curved lens 111 comprises eye-side surface 112 and world-side surface 113, wherein world-side surface 113 is opposite eye-side surface 112 across a thickness of curved lens 111 to delineate an internal volume of curved lens 111. Eye-side surface 112 has a first curvature. World-side surface 113 has a second curvature.

The center or axis of curvature, as appropriate, of eye-side surface 112 may be located at a distance of between 1 and 10 centimeters, between 10 and 50 cm, or between 50 and 1000 cm from eye-side surface 112, as non-limiting examples. The center or axis of curvature, as appropriate, of world-side surface 113 may be located at a distance of between 1 and 10 centimeters, between 10 and 50 cm, or between 50 and 1000 cm from world-side surface 113, as non-limiting examples. DOE 110 may receive guided light 143 traveling in light guide 114, and redirect guided light 143 to exit light guide 114 as redirected light 144 towards an eye of a user 120. Additionally, DOE 110 may apply a first optical power $\phi$ to redirected light 144. Eye-side surface 112 has a first curvature to apply a second optical power $\theta_1$ to the redirected light 144. The first optical power $\phi$ may be equal in magnitude and opposite in sign to the second optical power $\theta_1$. In other words, first optical power $\phi$ may compensate for the first curvature of eye-side surface 112.

Light guide 114 is embedded within an internal volume of curved lens 111. Light guide 114 is optically coupled to DOE 110 and DOE 115 to route light from DOE 115 through light guide 114 to DOE 110. DOE 115 may apply a third optical power $\beta$ to the light. Eye-side surface 112 has a first curvature to apply a fourth optical power $\theta_2$ to the light. Second optical power $\theta_1$ may be equal to fourth optical power $\theta_2$, such as if eye-side surface 112 is a spherical surface. Alternatively, second optical power $\theta_1$ may be different from fourth optical power $\theta_2$, such as if eye-side surface 112 is a free-form optical surface.

Lens assembly 100 can be illuminated with incident light 141. Upon reaching eye-side surface 112, the fourth optical power $\theta_2$ is applied to incident light 141; the resulting change in angle and/or convergence and/or divergence converts incident light 141 into incident light 142. At least a portion of incident light 142 is then redirected by DOE 115 to enter light guide 114 and form guided light 143. DOE 115 may apply a third optical power $\beta$ to guided light 143. Light guide 114 guides guided light 143 to DOE 110. At least a portion of guided light 143 is then redirected by DOE 110 to form redirected light 144.

Upon reaching eye-side surface 112, the second optical power $\theta_1$ is applied to redirected light 144; the resulting change in angle and/or convergence and/or divergence converts redirected light 144 into redirected light 145. Redirected light 145 then reaches eye of the user 120.

Environmental light 131 originates in the environment on the world-side of lens assembly 100. Upon reaching world-side surface 113, a fifth optical power may be applied to environmental light 131, converting environmental light 131 to environmental light 132. Upon reaching eye-side surface 112, a sixth optical power may be applied to environmental light 132, converting environmental light 132 to environmental light 133. Environmental light 133 has an angle that causes environmental light 133 to reach eye of the user 120. The sixth optical power applied to environmental light 132 may have a magnitude of zero, and the fifth optical power applied to environmental light 131 may have a magnitude of zero. In some implementations, the sixth optical power applied to environmental light 132 may be equal to the second optical power $\theta_1$, or may be different from the second optical power $\theta_1$.

Laser Projectors

A laser projector may produce an image that is visible to a user by projecting a pattern of light onto a non-user object such as a screen, a wall, or similar surface. The image formed by the pattern of light may then be viewed by the user by the process of having the viewer look at the non-user object to view the image formed on the non-user object. Alternatively, a laser projector may produce an image that is visible to the user by projecting a pattern of light onto the retina of the eye of the user; in this case the projector forms part of a virtual retina display (VRD).

Alternative projector technologies include microdisplays, digital light processing (DLP) projectors, Liquid Crystal Display (LCD) projectors, and Liquid Crystal on Silicon (LCoS) projectors.

Manufacture of a wearable heads-up display may include projector alignment, where the projector is aligned with a display element (hologram, light guide, etc.) of the wearable heads-up display to ensure that the image formed by the laser projector is visible to the user at a desired location within the field of view of the user. Laser projectors may contain more than one laser light source to allow full-color images to be displayed by the projector, where each laser light source projects a portion of an image and the combined light of all laser light sources forms a single image. A full-color laser projector typically contains a red, a green, and a blue laser light source. Each laser light source in the laser projector should be aligned with the display element of the wearable heads-up display and with each other laser light source within the projector so that the projector forms a single image, rather than multiple overlapping images.

The projector light must pass through the pupil of the eye of the user in order to reach the retina of the eye of the user, which may be achieved with projector light that originates (or appears to originate) within the field of view (FOV) of the eye of the user. The projector light may be directed through the pupil of the eye of the user by mounting the projector itself within the FOV of the eye of the user, or by redirecting the projector light via an optical element within the FOV of the eye of the user. Said optical element may obstruct at least a portion of the FOV of the eye of the user, as in the case of Google Glass®. In the alternative, projector light may be directed through the pupil of the eye of the user via a transparent combiner where the transparent combiner redirects at least a portion of the projector light into through the pupil of the eye of the user while allowing environmental light to pass through the transparent combiner and also be visible to the eye of the user. A transparent combiner can include a diffractive optical element (DOE). Non-exclusive examples of transparent combiners include holographic combiners and light guides employing DOEs as coupling elements.

A VRD employing a transparent combiner is advantageous as it allows the user to see the image produced by the projector without necessarily obstructing the field of view of the user, however the transparent combiner may require careful alignment of the DOE(s) in order for the projector to successfully direct light onto the retina of the eye of the user.

Light Guide Uniformity Correction

Light-guide based displays utilizing a scanning laser projector (SLP) as a light source operate by scanning a beam of laser light across a field, where each point of the field comprises a pixel. The field is the 2D area that defines the image generated by the display. The field typically comprises an array of pixels, each pixel having a unique location within the field in xy space; as a result, the scan beam has a unique angle for each pixel as well. An image is created by modulating (e.g. pulsing) the laser light as the field is scanned, providing a desired intensity of light for each pixel within the field. The intensity of the light comprises the intensity of the red, green, and blue (RGB) components of the display light. Uniform intensity across the field therefore includes both uniform overall brightness across the field and uniform color balance across the field.

The beam of laser light is scanned across an incoupler (IC). The IC directs the beam of laser light into a light guide, where the position and angle of the beam of laser light depends on the position of the pixel within the field at that point in the scan. The beam of laser light may propagate through an exit pupil expander (EPE) and then an outcoupler (OC). The EPE and the OC combine to replicate the beam of laser light to form a grid of exit pupils (EPs), where each point in the grid is an individual EP. Accommodation by the eye causes all of the EPs entering the eye to overlap on a single spot on the retina; each pixel within the field thereby maps to a corresponding spot position on the retina.

When a user directs their gaze within the display, their pupil will move across a given area. So long as at least one EP is able to enter the pupil at its current position the user will be able to see the display; this area across which the display is visible is called the eyebox. The grid of EPs formed by the EPE/OC combination creates a relatively large eyebox, creating a display with a relatively large field of view. The exit pupil spacing within the grid is typically smaller than the size of the pupil to eliminate "dead zones" within the display, where a "dead zone" is an area within the nominal eyebox where the display is not visible; therefore multiple exit pupils will typically enter the pupil.

As the projector scans across the field, the angle at which light propagates within the light guide changes due to changes in the angle and/or position of light impinging on the IC. This causes the position and spacing of the EPs forming the grid of exit pupils to vary across the field, with additional variation in grid position and spacing between colors (e.g. in a full color display utilizing red, green, blue lasers).

In a light guide based display utilizing a SLP, field-dependent grid spacing and position (i.e. the variation in EP position depending on field position and/or color) can cause the number of EPs from which light is able to enter the pupil, and the brightness of those EPs, to vary across the field. This creates a variation in the brightness across the field for a given position of the pupil of the eye of the user. In other words, the overall brightness and the color balance of the display will not be constant across the field of the display.

The field-dependent brightness variation also depends on the position of the pupil of the eye of the user, meaning that as the user moves their eye within the eyebox the field-dependent brightness variation will itself vary.

Field-dependent brightness variation may be corrected by applying an eyebox and field-dependent brightness correction to the projected image. An eyebox and field-dependent brightness correction may be generated and applied as a 2D map of brightness corrections. A brightness correction is an intentional variation in projector output power that is equal in magnitude and opposite in sign to the brightness variation across the field, wherein the brightness of each of: the red laser, the green laser, and the blue laser (RGB) in a RGB display are varied individually.

Figure 2:
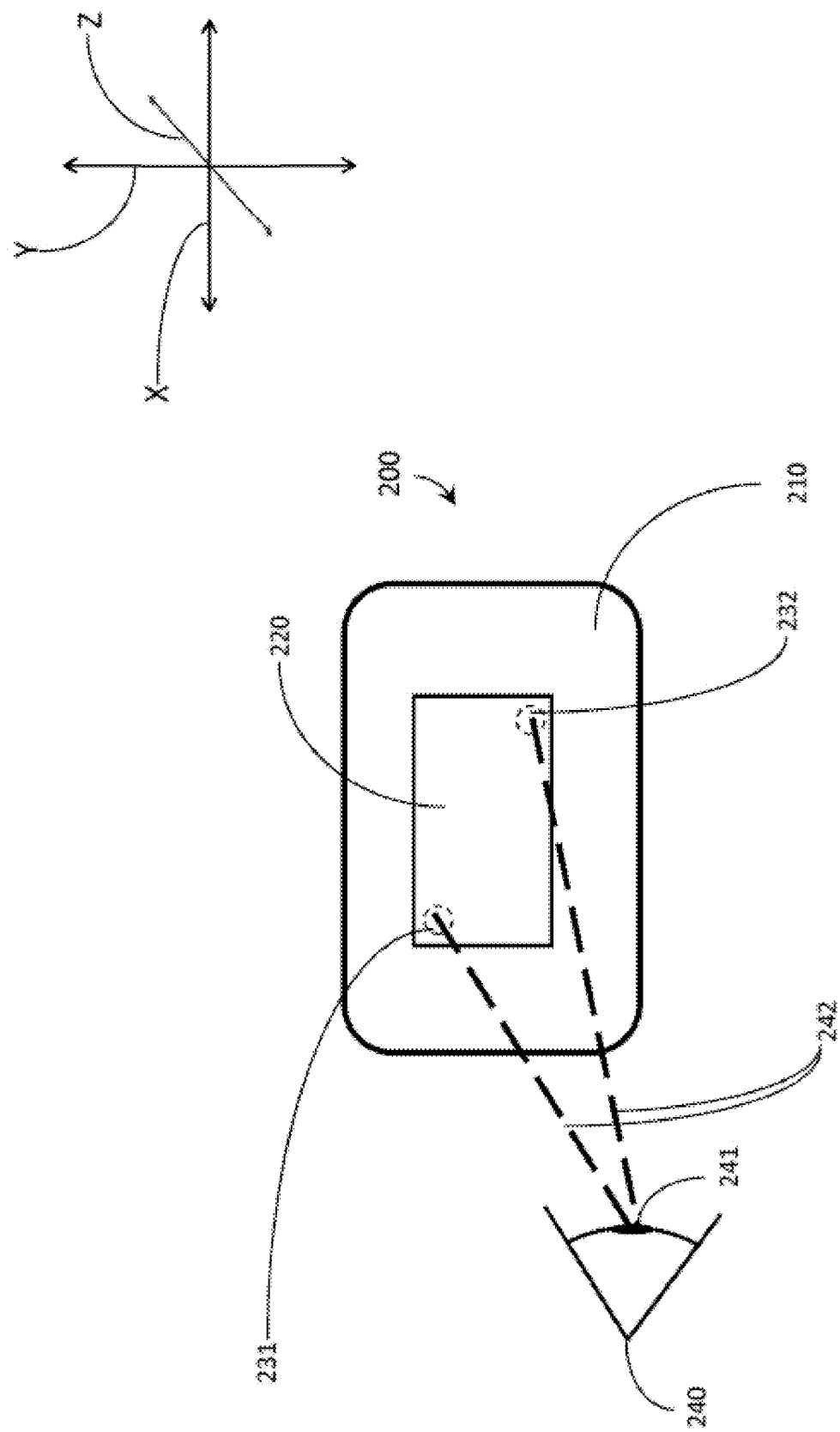
FIG. 2 is a front elevational view of a transparent combiner comprising a light guide with an eyebox in accordance with the present systems, devices, and methods.

FIG. 2 is a front elevational view of a transparent combiner 200 comprising a light guide 210 with an eyebox 220 in accordance with the present systems, devices, and methods. Light guide 210 is oriented in the X-Y plane. Eyebox 220 is depicted as a square shape with a size smaller than the size of light guide 210, however a person of skill in the art will appreciate that eyebox 220 is not limited to a square shape and may be of a size up to the size of light guide 210. Eye of the user 240 may be directed to a plurality of points within eyebox 220, allowing display light 242 to enter pupil of the eye of the user 241. Non-exclusive examples of points within eyebox 220 to which eye of the user 240 may be directed include first eyebox location 231 and second eyebox location 232.

FIG. 3A is a schematic representation of eyebox map 300. Eyebox map 300 is oriented in the XY plane, and each position within eyebox map 300 corresponds to a physical position within eyebox 220. Eyebox map 300 contains a plurality of points within eyebox map 300, non-exclusive examples of points within eyebox map 300 include first eyebox map location 310 and second eyebox map location 320. The position of first eyebox map location 310 within eyebox map 300 corresponds to the physical position of first eyebox location 231. The position of second eyebox map location 320 within eyebox map 300 corresponds to the physical position of second eyebox location 232.

FIG. 3B is a schematic representation of first brightness correction map 301. First brightness correction map 301 comprises correction intensity 311, correction intensity 312, correction intensity 313, correction intensity 314, and correction intensity 315 (collectively, correction intensities 311-315). Correction intensities 311-315 comprise variations in projector output that increase (or decrease) the intensity of projector light entering light guide 200 with a magnitude equal to the decrease (or increase, respectively) in intensity caused by field-dependent brightness variation for first eyebox location 231. Each of correction intensities 311-315 can include independent correction intensities for different color outputs of the projector.

FIG. 3C is a schematic representation of second brightness correction map 302. Second brightness correction map 302 comprises correction intensity 321, correction intensity 322, correction intensity 323, correction intensity 324, and correction intensity 325 (collectively, correction intensities 321-325). Correction intensities 321-325 comprise variations in projector output that increase (or decrease) the intensity of projector light entering light guide 200 with a magnitude equal to the decrease (or increase, respectively) in intensity caused by field-dependent brightness variation for second eyebox location 232. Each of correction intensities 321-325 can include independent correction intensities for different color outputs of the projector.

In a second implementation, the first 2D map layer is the eyebox map, that maps pupil position within the eyebox to a given field correction. The second 2D map layer is the field correction, which applies a brightness correction across the field that is specific to a given pupil position.

Firstly, the position of the eye of the user may be determined, and that information may be used to determine which field correction to apply. Eye tracking may be used to determine a pupil position, the pupil position may then be compared to an eyebox map. The eyebox map is an x-y array of pupil positions, where each pupil position has a corresponding field correction. The eyebox map may be generated by modelling the field-dependent brightness variation for each position of the pupil within the eyebox. The eyebox map may be generated by measuring the field-dependent brightness variation for each position of the pupil within the eyebox.

A brightness correction may then be applied across the field, wherein the brightness correction is specific to the pupil position determined previously. The brightness correction comprises a variation in the projector output, creating uniform brightness across the field as seen by the eye of the user. Each brightness correction comprises a 2D map of the required power output of each laser diode (RGB) that ensures that the overall brightness (and consequently the RGB balance) is constant across the entire 2D projector field.

The field correction therefore varies as a function of the position of the pupil within the eyebox to maintain uniform brightness across the field as the pupil of the eye of the user moves around the eyebox.

In a third implementation, the brightness correction for the current position of the eye of the user may be first calculated and then applied to the projector output; as the eye of the user moves within the eyebox the brightness correction may be re-calculated and re-applied to the projector output.

Applying a brightness correction across the field may include applying a brightness correction that maximizes uniformity horizontally within the field, then achieves the greatest vertical uniformity that does not compromise horizontal uniformity.

Grating Cosmetic Effect Reduction

A wearable heads up display (WHUD) can include an optical combiner which receives light from a light source, such as a laser projector or microdisplay, and redirects the received light towards an eye of a user. Further, a WHUD can include multiple intervening elements which guide light from the light source towards an eye of the user.

Figure 4A:
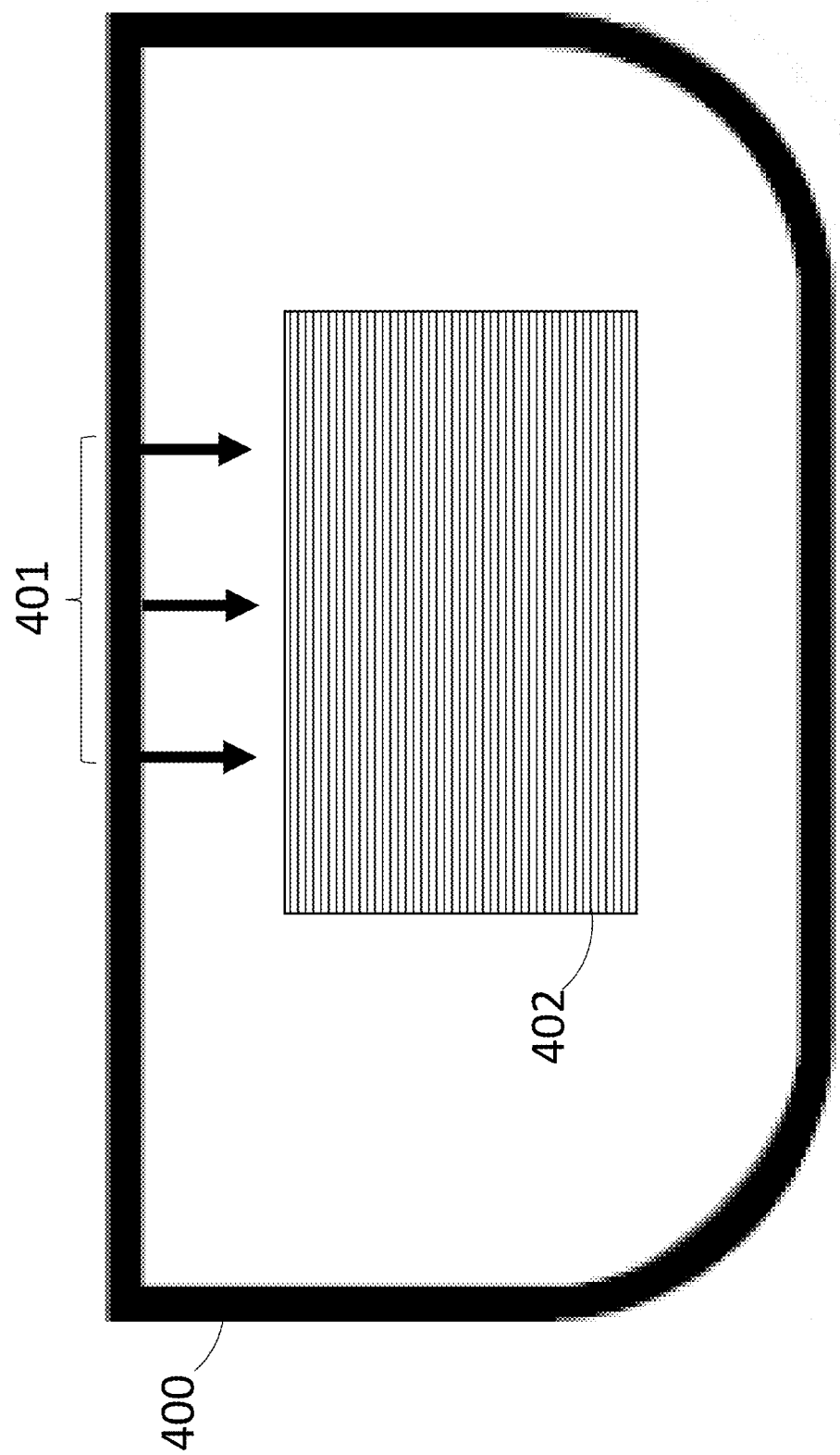
FIG. 4A is a front view of an optical combiner which in use is to be positioned in a field of view of a user of a WHUD.

FIG. 4A is a front view of an optical combiner 400 of a WHUD which in use is to be positioned in a field of view of a user of the WHUD. The optical combiner 400 includes a grating 402, which receives light 401 and redirects light 401 towards an eye of the user. Light 401 can be provided by a light source carried by the WHUD, such as a laser projector or microdisplay. Light 401 could be input into a periphery of optical combiner 401. Optical combiner 400 could include a lightguide therein to guide light 401 to grating 402 by total internal reflection. In one implementation, optical combiner 400 could itself function as a lightguide which guides light 401 to grating 402 by total internal reflection. Alternatively, light 401 could be provided from outside optical combiner 400, to impinge directly on grating 402. As one example, light 401 could be provided by a light source carried by a temple arm of a WHUD which projects light at an angle towards grating 402.

Unless specified otherwise, any gratings discussed herein could be for example surface relief gratings (SRG) or holographic gratings (HG). Further, unless specified otherwise any gratings herein could be for example a plurality of wavelength-multiplexed holographic gratings which overlap each other, where each of the holographic gratings is tuned to redirect light of a specific wavelength. Light could be projected at specific wavelengths corresponding to the wavelengths of the wavelength multiplexed holographic gratings. As an example, a laser projector could include three laser diodes which output light at three different wavelengths (such as red, green, and blue). Each of the holographic gratings could be tuned to redirect only light of a wavelength or wavelength band which matches the wavelength of light output by a respective laser diode in the laser projector. In this way, each color of light can be output to a holographic grating tuned to the color being output.

Regardless of the type of grating used, grating 402 can cause visible non-uniformity in the optical combiner 400, because grating 402 influences light differently than the rest of optical combiner 400. For example, a line may be visible along the boundary between grating 402 and the rest of optical combiner 400. Such a line could for example be caused by a sudden difference in optical power between grating 402 and optical combiner 400. Such a line could also be caused by a difference in reflective properties between grating 402 and the rest of optical combiner 400. Such a line could also be caused by a difference in color and/or color dynamics between grating 402 and the rest of optical combiner 400. Such a line could also be caused by any combination of the above factors. Such visible features are generally unattractive and reduce the aesthetic appeal of the WHUD. Thus, it is desirable to reduce the appearance of such unattractive features, to improve aesthetics of the WHUD.

FIG. 4B-4E illustrate several exemplary implementations which reduce the appearance of unattractive features caused by the difference in optical influence of gratings compared to the rest of an optical combiner. The term "optical influence" used herein generally refers to the effect a material has on light incident thereon, which could include reflection, refraction, redirection, color modulation, or any other appropriate change caused to incident light.

Figure 4B:
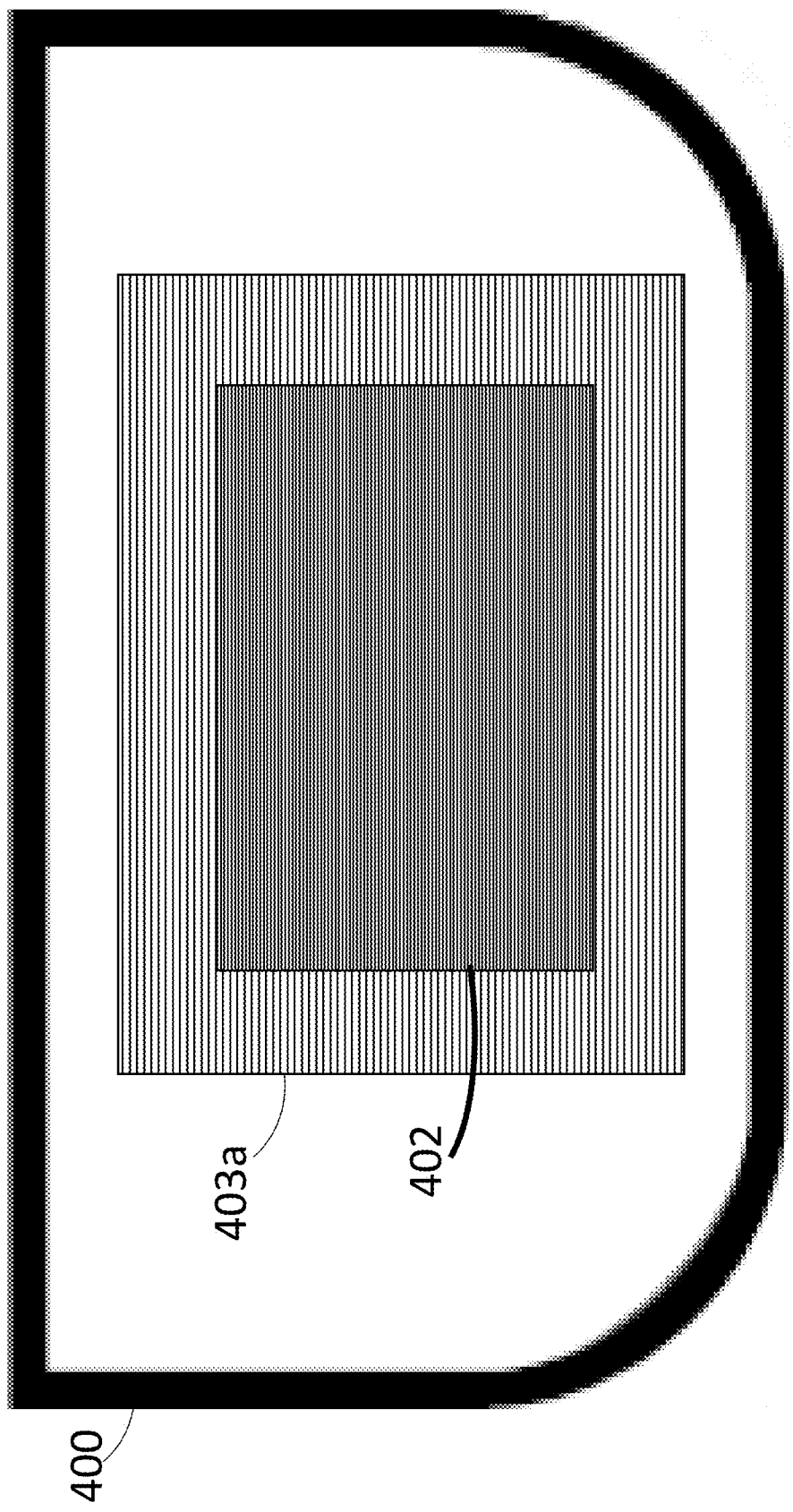
FIG. 4B is a front view of an optical combiner which introduces a secondary grating adjacent a primary grating to reduce the appearance of differences between the primary grating and the rest of the optical combiner, according to at least one exemplary implementation.

FIG. 4B is a front view of an optical combiner 400 which introduces a secondary grating 403a around grating 402 to reduce the appearance of differences between the grating 402 and the rest of optical combiner 400. Secondary grating 403a can be a grating which has an optical influence between that of grating 402 and the rest of optical combiner 400.

In one example, grating 402 could redirect incident light with a certain non-zero grating efficiency. In the context of the present invention, grating efficiency refers to the amount of incident light which is redirected in the desired order. The rest of optical combiner 400 can have virtually zero efficiency as a grating, since there is no desired order for light to be redirected. This difference can create a visible harsh line at the boundary of grating 402. To address this, secondary grating 403a can be provided which has a grating efficiency between the grating efficiency of grating 402 and the rest of the optical combiner 400. Consequently, instead of a single harsh line at the border of grating 402, there will be a first gentle line at the border between grating 402 and secondary grating 403a, and a second gentle line at the border between secondary grating 403a and the rest of the optical combiner 400. In the case of SRGs, secondary grating 403a could be designed to have a lower grating efficiency than grating 402 by, for example, providing secondary grating 403a with a different fill factor and/or height than grating 402. In the case of HGs, secondary grating 403a could be designed to have a lower grating efficiency than grating 402 by, for example, recording the secondary grating 403a with a lower refractive index contrast than grating 402.

Figure 4C:
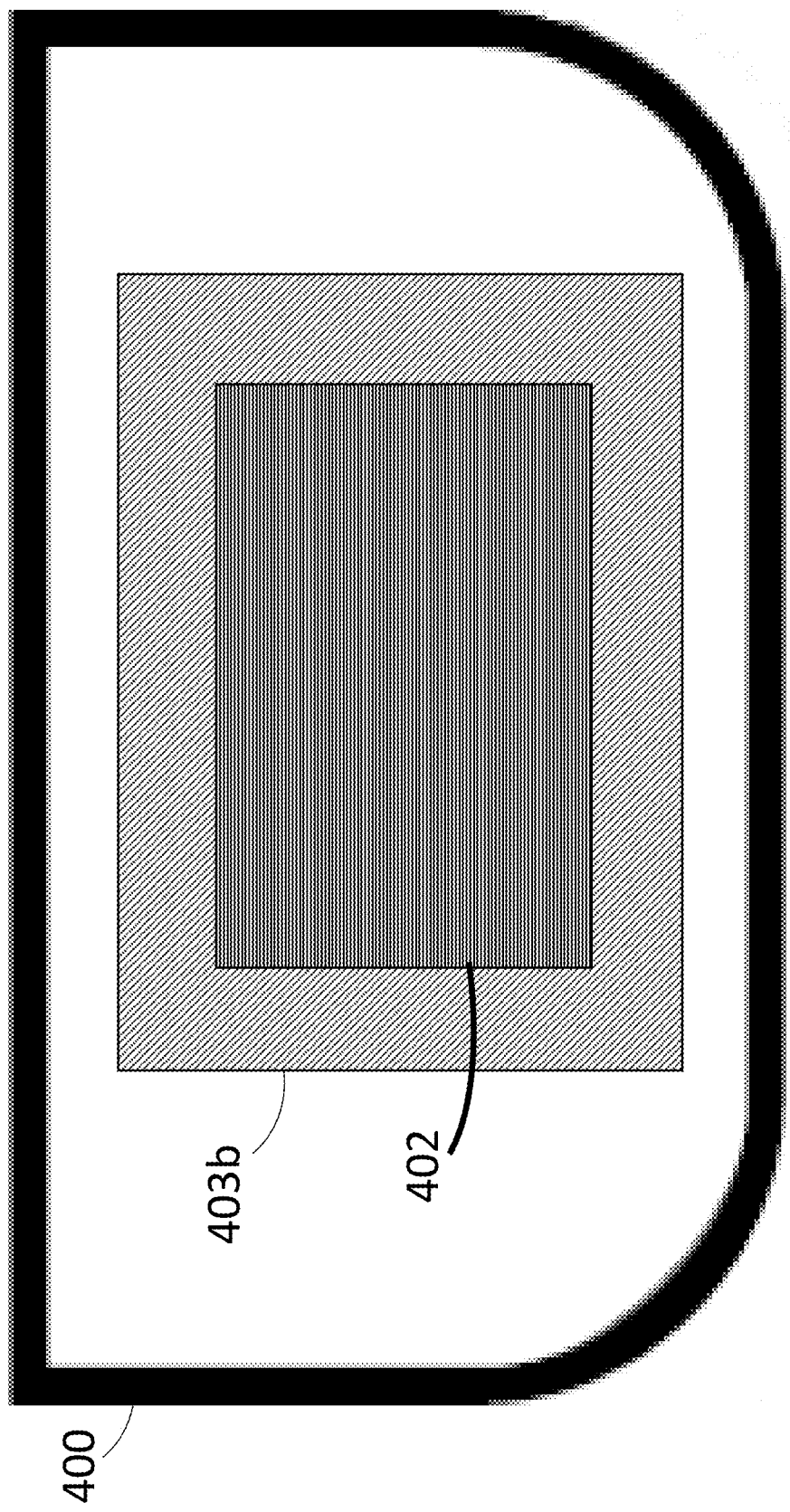
FIG. 4C is a front view of an optical combiner which introduces a secondary grating adjacent a primary grating to reduce the appearance of differences between the primary grating and the rest of the optical combiner, according to at least one other exemplary implementation.

FIG. 4C is a front view of an optical combiner 400 similar to that described with reference to FIG. 4B. One difference between FIG. 4C and FIG. 4B is that in FIG. 4C, secondary grating 403b is positioned on optical combiner 400 at a different angle from grating 402. This difference in grating angle can reduce the visibility of the boundary of grating 402. This could be effective for example when a user is moving their head, by reducing sudden flashes of light from the gratings as the angle of incident light changes.

Figure 4D:
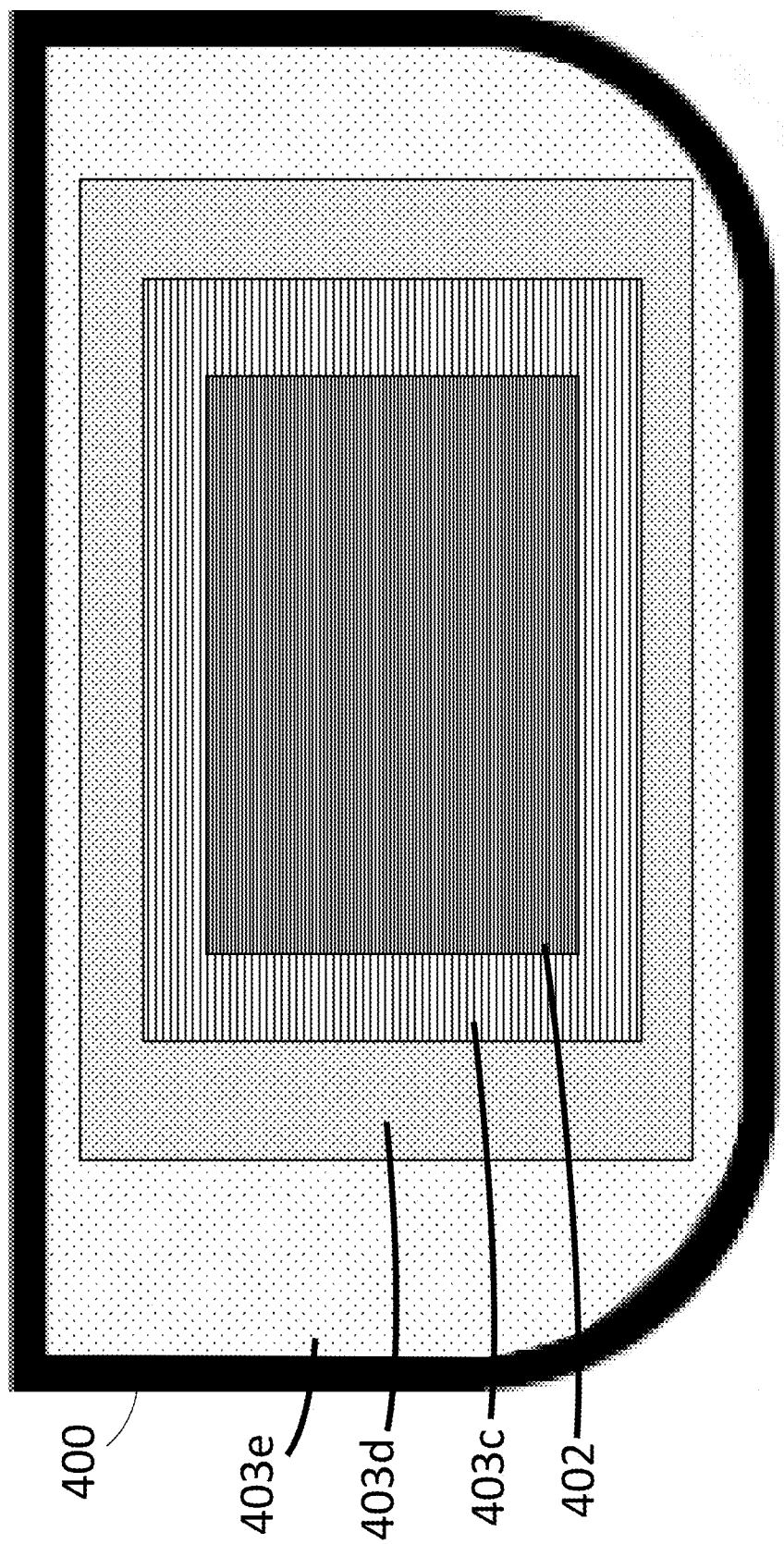
FIG. 4D is a front view of an optical combiner which introduces a plurality of secondary gratings adjacent a primary grating.

The present invention is not limited to disposing a single secondary grating on an optical combiner. FIG. 4D is a front view of an optical combiner 400 in which several secondary gratings 403c, 403d, and 403e are disposed around grating 402. Grating 402 can have a non-zero optical influence (e.g. grating efficiency), secondary grating 403c can have an optical influence (e.g. grating efficiency) lower than grating 402, secondary grating 403d can have an optical influence (e.g. grating efficiency) lower than secondary grating 403c, and secondary grating 403e can have an optical influence (e.g. grating efficiency) lower than secondary grating 403d. That is, the optical influence (e.g. grating efficiency) decreases the further a secondary grating is from grating 402, such that the succession of secondary gratings will step down optical influence from grating 402 to the edge of the outermost secondary grating. Consequently, instead of a single harsh line between grating 402 and the rest of optical combiner 400, there will be several gentle lines at each of the secondary grating boundaries. If enough different secondary gratings are used, the lines between each boundary may not be visible at all to the human eye.

In another implementation, a secondary grating can be positioned around grating 402, where optical influence (e.g. grating efficiency) of the secondary grating will decrease according to a gradient depending on distance from the grating 402. For example, grating efficiency of a secondary grating may match grating efficiency of grating 402 at a boundary between the secondary grating and grating 402, but grating efficiency of the secondary grating may gradually decrease to zero at a non-zero distance from grating 402, such that the secondary grating smoothly fades from the grating efficiency of grating 402 to the grating efficiency of the optical combiner 400 (virtually zero).

Further, it is within the scope of the present invention to cover the entire visible surface of optical combiner 400 with a secondary grating such as secondary grating 403e in FIG. 4D, such that there is no boundary line between the outermost secondary grating and the visible area of the optical combiner 400. This could be done in implementations in which only a single secondary grating is used, such as FIG. 4B for example. In some implementations, grating 402 could cover the entire area of optical combiner 400, such that there are no boundary lines at all.

Figure 4E:
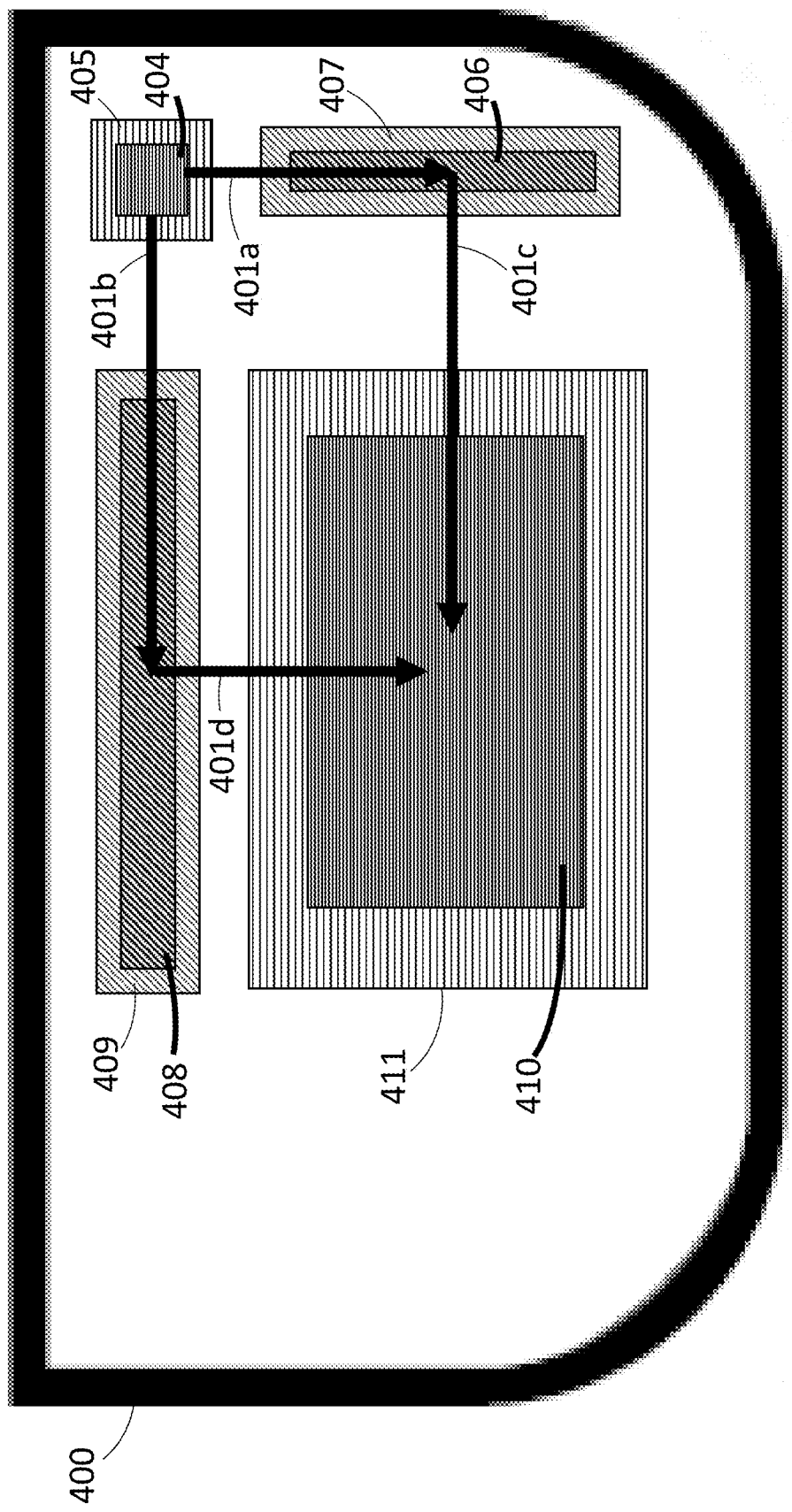
FIG. 4E is a front view of an optical combiner which includes an incoupler grating which receives light from a light source carried by a WHUD, and redirects the received light towards exit pupil expander gratings.

Additionally, the present invention is not limited to being applied to a single grating 402. Rather, the present invention is applicable to any number of gratings positioned on an optical combiner. For example, FIG. 4E is a front view of an optical combiner 400 which includes an incoupler (IC) grating 404 which receives light from a light source carried by a WHUD, and redirects the received light as light 401a and 401b towards exit pupil expander (EPE) gratings 406 and 408. Exit pupil expander gratings 406 and 408 receive light 401a and 401b respectively, and redirect light 401a and 401b as light 401c and 401d respectively towards outcoupler (OC) grating 410, which redirects light 401c and light 401d towards and eye of the user. This display architecture having incoupler, exit pupil expansion, and outcoupler gratings is further described with reference to FIG. 7.

In the example of FIG. 4E, incoupler grating 404 is surrounded by secondary grating 405, exit pupil expander grating 406 is surrounded by secondary grating 407, exit pupil expander grating 408 is surrounded by secondary grating 409, and output coupler grating 410 is surrounded by secondary grating 411. Each of secondary gratings 405, 407, 409, and 411 can comprise a single grating or a plurality of gratings which smooth the difference in optical influence at the boundaries of the respective grating which they surround, to reduce the visibility of each of the boundaries. The precise implementation of any or all of secondary gratings 405, 407, 409, and 411 can be based on the secondary gratings discussed with reference to FIGS. 4B-4D.

Although several of the above implementations focus on providing secondary gratings with lower optical influence (e.g. grating efficiency) than the grating which they surround, the present invention includes using any appropriate technique for smoothing the boundaries between gratings, such as having the secondary grating be at a different angle than the grating which is surrounded.

Chromatic Incoupler Correction

In a WHUD utilizing a surface relief grating (SRG) as the incoupler (IC) double bounces may occur in the incoupler region. An incoupler (IC) couples light into the light guide, in other words light incident on the IC is redirected at an angle sufficient to experience total internal reflection (TIR) and propagate within the light guide by reflecting off opposed surfaces of the light guide. After incoupling has occurred, the light will travel a distance dependent on the incoupling angle, bounce off the opposite surface of the light guide, travel at least approximately the same distance, and encounter the same side of the light guide as the IC. The distance travelled between successive bounces on the same surface is referred to as the bounce length of the light within the light guide.

Double bounces occur when the light that is successfully coupled into the light guide by the IC has a bounce length short enough that the successfully incoupled light impinges on the incoupler while propagating through the light guide. For a SRG IC, the double bounce will couple at least some of the propagating light back out of the light guide, lowering the efficiency of the incoupler. In other words, double bounces cause power losses within the light guide.

Bounce length in an SRG based light guide is wavelength dependent, meaning that blue light typically has a shorter bounce length than red light, causing blue wavelengths of light to experience a greater number of double bounces (and/or triple bounces, quadruple bounces, etc.) than red light; this causes the power loss due to double bounces to be wavelength dependent. The position on the IC at which the light impinges on the IC also affects the number of double bounces which occur, since incoupling position affects the distance across the IC that must be traversed before reaching the end of the IC.

Double-bounce power losses may vary based on two broad causes: field-dependent double bounces and wavelength dependent double bounces.

Figure 5:
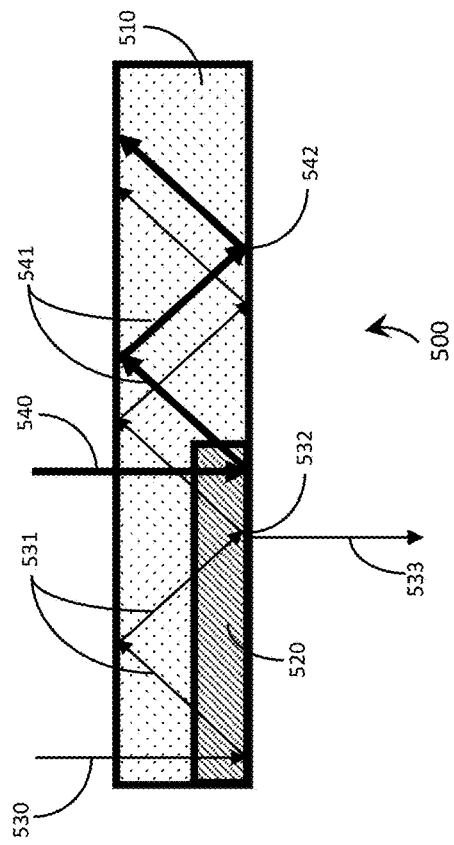
FIG. 5 is a cross-sectional diagram of an exemplary light guide in accordance with the present systems, designs, and methods.

FIG. 5 is a cross-sectional diagram of light guide 500 in accordance with the present systems, designs, and methods. Light guide 500 comprises bulk light guide material 510 and incoupler (IC) 520. First ray of light 530 impinges on light guide 500, passing through bulk light guide material 510 to impinge on IC 520. IC 520 redirects at least a portion of first ray of light 530 to form first propagating light 531. First propagating light 531 propagates through light guide 500 by reflecting off the surfaces of light guide 500 due to total internal reflection (TIR). Only two segments of propagating light have been labelled explicitly in FIG. 5 for clarity. First propagating light 531 impinges on the same surface as IC 520 at first ray bounce location 532. The distance between the location where first ray of light 530 impinges on IC 520 and first ray bounce location 532 is the bounce length of first propagating light 531. First ray bounce location 532 lies within IC 520, therefore at least a portion of first propagating light 531 is outcoupled from light guide 500 to form outcoupled light 533, reducing the intensity of first propagating light 531. In other words, the intensity of first propagating light 531 has been reduced due to double bounces.

Second ray of light 540 impinges on light guide 500, passing through bulk light guide material 510 to impinge on IC 520. IC 520 redirects at least a portion of second ray of light 540 to form second propagating light 541. Second ray of light 540 impinges on IC 520 at a location closer to the edge of IC 520 in the direction of propagation of second propagating light 541 relative to first ray of light 530. Second propagating light 531 impinges on the same surface as IC 520 at second ray bounce location 542. The distance between the location where second ray of light 540 impinges on IC 520 and second ray bounce location 542 is the bounce length of second propagating light 541. Second ray bounce location 542 is located outside IC 520, therefore the intensity of second propagating light 541 is not decreased due to double bounces. First propagating light 531 and second propagating light 541 have the same bounce length, which may be due to first ray of light 530 having the same wavelength as second ray of light 540. The difference in location between first ray of light 530 and second ray of light 540 causes first propagating light 531 to experience double bounces while second propagating light 541 does not experience double bounces.

First ray of light 530 and second ray of light 540 may comprise the outermost rays of a beam of light; in other words the distance between first ray of light 530 and second ray of light 540 may comprise the beam size of a beam of light impinging on IC 520. Varying the size of a beam of light changes the location of the rays of said beam of light, thereby changing the power loss due to double bounces. The intensity of light transmitted through the light guide may be made uniform across the FOV of the user and across the entire spectrum of wavelengths transmitted by the light guide if the power loss due to double-bounces is uniform. Double-bounce power losses may be made more uniform by adjusting the beam size and the beam position of each beam of light impinging on the incoupler to ensure the same number of double bounces occur for each wavelength and each part of the FOV of the display.

Figure 6:
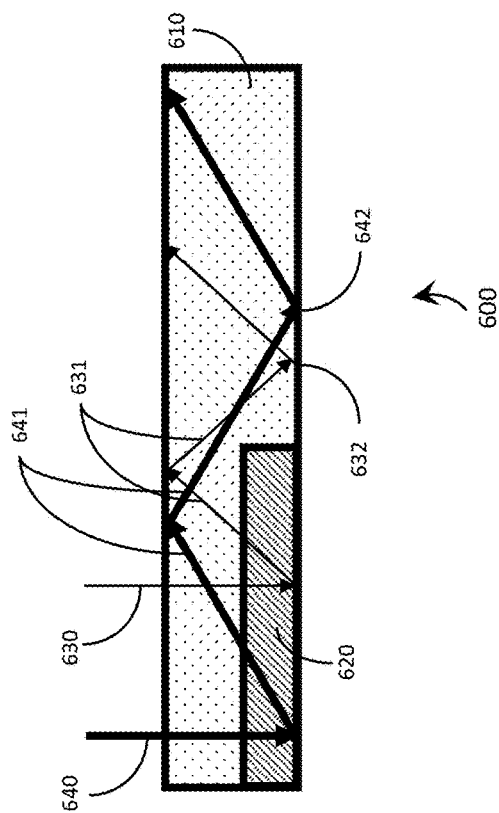
FIG. 6 is a cross-sectional diagram of another exemplary light guide in accordance with the present systems, designs, and methods.

FIG. 6 is a cross-sectional diagram of light guide 600 in accordance with the present systems, designs, and methods. Light guide 600 comprises bulk light guide material 610 and incoupler (IC) 620. Light guide 600 may be similar in some ways to light guide 500. First ray of light 630 impinges on light guide 600, passing through bulk light guide material 610 to impinge on IC 620. IC 620 redirects at least a portion of first ray of light 630 to form first propagating light 631. First propagating light 631 propagates through light guide 600 by reflecting off the surfaces of light guide 600 due to total internal reflection (TIR). Only two segments of propagating light have been labelled explicitly in FIG. 6 for clarity. First propagating light 631 impinges on the same surface as IC 620 at first ray bounce location 632. The distance between the location where first ray of light 630 impinges on IC 620 and first ray bounce location 632 is the bounce length of first propagating light 631.

Second ray of light 640 impinges on light guide 600, passing through bulk light guide material 610 to impinge on IC 620. IC 620 redirects at least a portion of second ray of light 640 to form second propagating light 641. Second ray of light 640 impinges on IC 620 at a location closer to the edge of IC 620 in the direction of propagation of second propagating light 641 relative to first ray of light 630. Second propagating light 631 impinges on the same surface as IC 620 at second ray bounce location 642. The distance between the location where second ray of light 640 impinges on IC 620 and second ray bounce location 642 is the bounce length of second propagating light 641.

The bounce length of first propagating light 531 is shorter than the bounce length of second propagating light 541 due to the difference in the angle at which IC 620 redirects first ray of light 630 and second ray of light 640. This may be due to first ray of light 630 having a shorter wavelength than second ray of light 640. If the location of first ray of light 630 was moved to overlap the location of second ray of light 640, first propagating light 631 would experience power loss due to double bounces.

First ray of light 630 and second ray of light 640 may comprise the outermost rays of a beam of light; in other words the distance between first ray of light 630 and second ray of light 640 may comprise the beam size of a beam of light impinging on IC 620.

Power loss variation due to wavelength dependent double bounces may be corrected for by changing the size of the beams for red, green, and blue light. In a first implementation, the red beam is largest and the blue beam is smallest, thus light of each wavelength experiences the same number of double-bounces because the difference in bounce length is counterbalanced by the difference in beam size (and therefore path length within the waveguide). A person of skill in the art will appreciate that beam size is typically within an order of magnitude of the size of the IC, making beam size variation particularly effective at controlling the number of double bounces which occur within the light guide.

Alternatively, the position (in the XY plane) on the incoupler may be varied between RGB. In a first implementation, the red beam impinges on the IC at a position furthest from the edge of the IC in the direction of propagation, while the blue beam impinges on the IC at a position closest to said edge. The number of double bounces may be balanced between wavelengths by increasing the path length of red light in proportion to the increase in bounce length of red light relative to the bounce length of blue light.

Field-dependent power loss due to double bounces occurs because, depending on which point of the field is currently being passed through the IC, the position and/or the angle at which the coupled light impinges on the IC will differ, causing bounce length (and therefore the number of double bounces) to vary across the field. Correction for field-dependent power loss may be done in the projector by varying RGB power as a function of the field, and/or by introducing a neutral-density filter with a transmittance that varies as a function of the field, or with an aspheric lens that varies beam size as a function of the field.

FOV Enhancement Using Multiple Light Guide Paths

Figure 7:
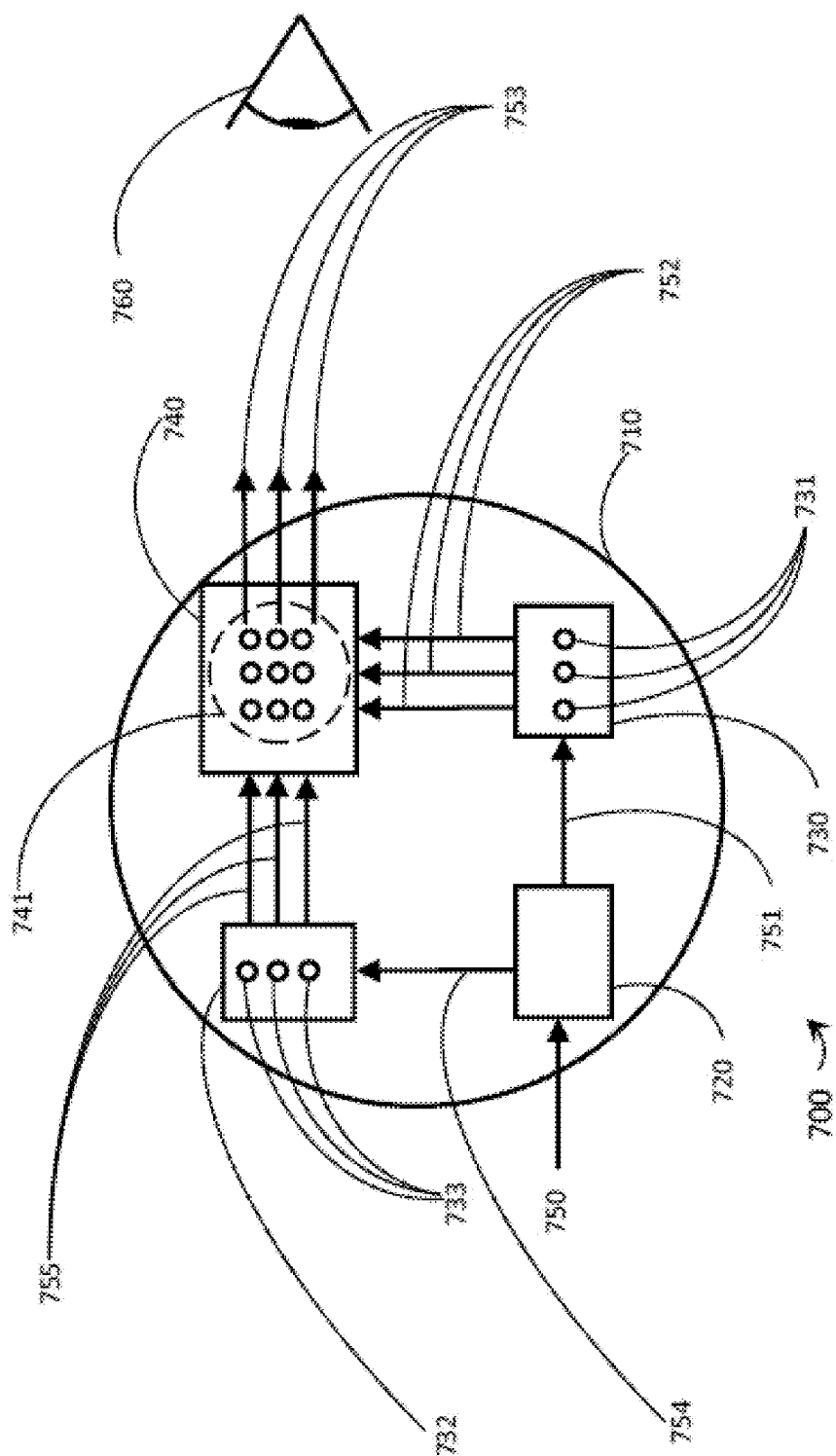
FIG. 7 is a front-elevational view of an exemplary light guide based wearable heads-up display ("WHUD") in accordance with the present systems, devices, and methods.

FIG. 7 is a front-elevational view of a light guide based wearable heads-up display ("WHUD") 700 in accordance with the present systems, devices, and methods. Light guide based WHUD 700 comprises light guide 710, first diffractive optical element (DOE) 720, second DOE 730, third DOE 740, and fourth DOE 732.

First DOE 720 comprises an incoupler (IC) that diffracts incident light 750 into light guide 710, converting incident light 750 into first guided light 751 and second guided light 754. First guided light 751 and second guided light 754 each comprise a portion of the display light. First guided light 751 may comprise a first portion of the field of view (FOV) of the display, while second guided light 754 comprises a second portion of the FOV of the display. First guided light 751 may comprise a first portion of the colors comprising the display light, while second guided light 754 comprises a second portion of the colors of the display light.

Incident light 750, first guided light 751, and second guided light 754, each comprise at least one exit pupil. Light guide 710 routes first guided light 751 to second DOE 730. Second DOE 730 comprises a first exit pupil replicator. Second DOE 730 replicates the at least one exit pupil of first guided light 751 to form first set of exit pupils 731. First set of exit pupils 731 comprises at least one first sub-set of exit pupils, wherein each first sub-set of exit pupils is oriented in a first orientation. Second DOE 730 redirects first set of exit pupils within light guide 710. Light guide 710 routes first set of exit pupils 731 to third DOE 740.

Light guide 710 routes second guided light 754 to fourth DOE 732. Fourth DOE 732 comprises a second exit pupil replicator. Fourth DOE 732 replicates the at least one exit pupil of second guided light 754 to form second set of exit pupils 733. Second set of exit pupils 733 comprises at least one second sub-set of exit pupils, wherein each second sub-set of exit pupils is oriented in a second orientation. Fourth DOE 732 redirects second set of exit pupils 733 within light guide 710. Light guide 710 routes second set of exit pupils 733 to third DOE 740.

Third DOE 740 comprises a third exit pupil replicator. Third DOE 740 replicates first set of exit pupils 731 and second set of exit pupils 733 to form third set of exit pupils 741. Third set of exit pupils 741 comprises at least one third sub-set of exit pupils, wherein each third sub-set of exit pupils is oriented in a different orientation to the set of exit pupils forming the respective sub-set. Third DOE 740 comprises an outcoupler (OC). Third DOE 740 outcouples each exit pupil comprising second set of exit pupils 741 towards target area 760.

In some implementations, DOE 720 may not split incident light 750 into two portions. As one example, DOE 720 may redirect incident light into light guide 710 as first guided light 751, and the WHUD 700 may comprise DOE 730 but not DOE 732. As another example, DOE 720 may redirect incident light into light guide 710 as second guided light 754, and the WHUD 700 may comprise DOE 732 but not DOE 730.

However, the range of angles of light that may be successfully guided by light guide 710 may limit the field of view ("FOV") of light guide 710 if the range of input angles to first DOE 720 is always equal to the range of angles within light guide 710. The range of angles incident on first DOE 710 may be greater than the range of angles within light guide 710 if first DOE 720 divides incident 750 into at least two portions. The first portion follows a path within light guide 710 that includes second DOE 730, while a second portion of light follows a path that includes fourth DOE 732. First DOE 720 may divide incident light 750 into two portions via angle multiplexing, thereby dividing incident light 750 into two portions of FOV; in other words a first portion of the FOV follows a first path and a second portion of FOV follows a second path. Incident light 750 may be split into two portions by having first DOE 720 comprise two discrete DOEs.

First DOE 720 may divide incident light 750 into two portions via wavelength multiplexing, thereby dividing incident light 750 into two portions of color; in other words a first set of colors follows a first path and a second set of colors follows a second path. In a first example, all the red field of view and some part of the blue and green field of view is guided through one light path within the lightguide, and the rest through the other part. In a second example, all blue is through the same part, whereas red and green are split.

First DOE 720 and third DOE 740 may comprise 2D gratings. A 2D grating will have diffraction orders which are characterized by two indices, e.g., (+1, 0), (−1, 0), or (1, 1) or (2, −1) etc. In the alternative, a first DOE may be located on a first surface of the light guide, and a second DOE may be located on a second surface of the light guide opposite the first surface. First DOE 720, second DOE 730, third DOE 740, and fourth DOE 732 may comprise a hologram, where a hologram may comprise a wavelength multiplexed hologram and/or an angle multiplexed hologram.

Two-Dimensional Exit-Pupil Expander/Outcoupler

Figure 8:
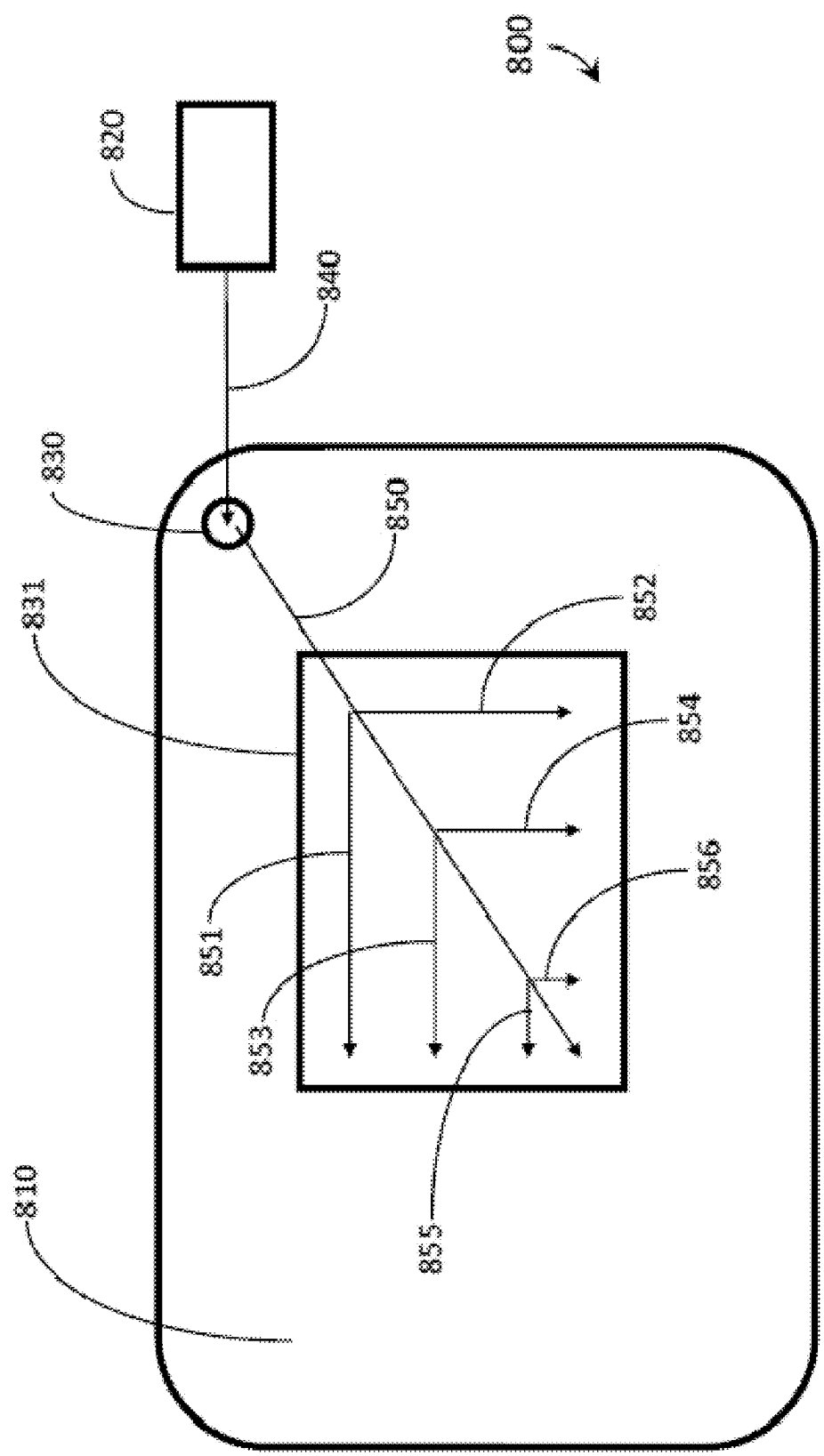
FIG. 8 is a front elevational view of another exemplary light guide based wearable heads-up display ("WHUD") in accordance with the present systems, devices, and methods.

FIG. 8 is a front elevational view of a light guide based wearable heads-up display ("WHUD") 800 in accordance with the present systems, devices, and methods. Light guide based WHUD 800 comprises light guide 810 and light source 820. Light guide 810 comprises incoupler (IC) 830 and two-dimensional exit-pupil expander/outcoupler (2D EPE/OC) 831.

2D EPE/OC 831 may comprise an angle multiplexed hologram; an angle multiplexed hologram is advantageous due to the narrow angular bandwidth of holograms, which reduces crosstalk within 2D EPE/OC 831. 2D EPE/OC 831 may comprise a wavelength-multiplexed hologram.

Light source 820 produces display light 840 which impinges on IC 830. IC 830 couples at least a portion of display light 840 into light guide 810 to form guided light 850. Guided light 850 is directed by IC 830 with an angle that directs guided light 850 to propagate through light guide 810 into 2D EPE/OC 831. Guided light 850 propagates across 2D EPE/OC 831, impinging on 2D EPE/OC 831 with at least every second bounce.

2D EPE/OC 831 splits guided light 850 into at least two new portions of light with each bounce of guided light 850 onto 2D EPE/OC 831, where the two new portions of light travel in different directions to one another. A first bounce of guided light 850 produces first replicated light 851 and second replicated light 852. In some implementations, the angle between first replicated light 851 and second replicated light 852 may be at least approximately 90 degrees. In other implementations, the angle between first replicated light 851 and second replicated light 852 may be approximately 180 degrees. The angle between first replicated light 851 and second replicated light 852 may be different in different implementations.

A second bounce of guided light 850 produces third replicated light 853 and fourth replicated light 854. In some implementations, the angle between third replicated light 853 and fourth replicated light 854 may be at least approximately 90 degrees. In other implementations, the angle between third replicated light 853 and fourth replicated light 854 may be approximately 180 degrees. The angle between third replicated light 853 and fourth replicated light 854 may be different in different implementations.

A third bounce of guided light 850 produces fifth replicated light 855 and sixth replicated light 856. In some implementations, the angle between fifth replicated light 855 and sixth replicated light 856 may be at least approximately 90 degrees. In other implementations, the angle between fifth replicated light 855 and sixth replicated light 856 may be approximately 180 degrees. The angle between fifth replicated light 855 and sixth replicated light 856 may be different in different implementations.

2D EPE/OC 831 comprises at least two DOEs. A first DOE redirects a portion of light impinging upon 2D EPE/OC 831 out of the light guide and into the eye of the user; the first DOE may be referred to as an outcoupling DOE. A second DOE redirects a portion of light impinging upon 2D EPE/OC 831 into a new direction of propagation within the light guide, for example as first replicated light 851, second replicated light 852, third replicated light 853, fourth replicated light 854, and fifth replicated light 855, or sixth replicated light 856. Such light traveling in a new direction of propagation through light guide 810 impinges on 2D EPE/OC 831, and 2D EPE/OC 831 may outcouple a portion of said light traveling in a new direction of propagation with each bounce.

The angular bandwidth of the outcoupling DOE may be small enough that the angle at which first replicated light impinges on 2D EPE/OC 831 is outside said angular bandwidth. 2D EPE/OC 831 may comprise a second outcoupling DOE to outcouple light with an angle of impingement equal to the angle of impingement of first replicated light 851 (and by extension, the angle of impingement of third replicated light 853, fifth replicated light 855, etc.).

Second replicated light 852 (as well as fourth replicated light 854 and sixth replicated light 856) may require a third outcoupling DOE due to the difference in angle between second replicated light 852, first replicated light 851, and guided light 850 placing second replicated light 852 outside the angular bandwidth of the first outcoupling DOE and the second outcoupling DOE.

FOV Expansion Via Wavelength Offset Projectors

Figure 9:
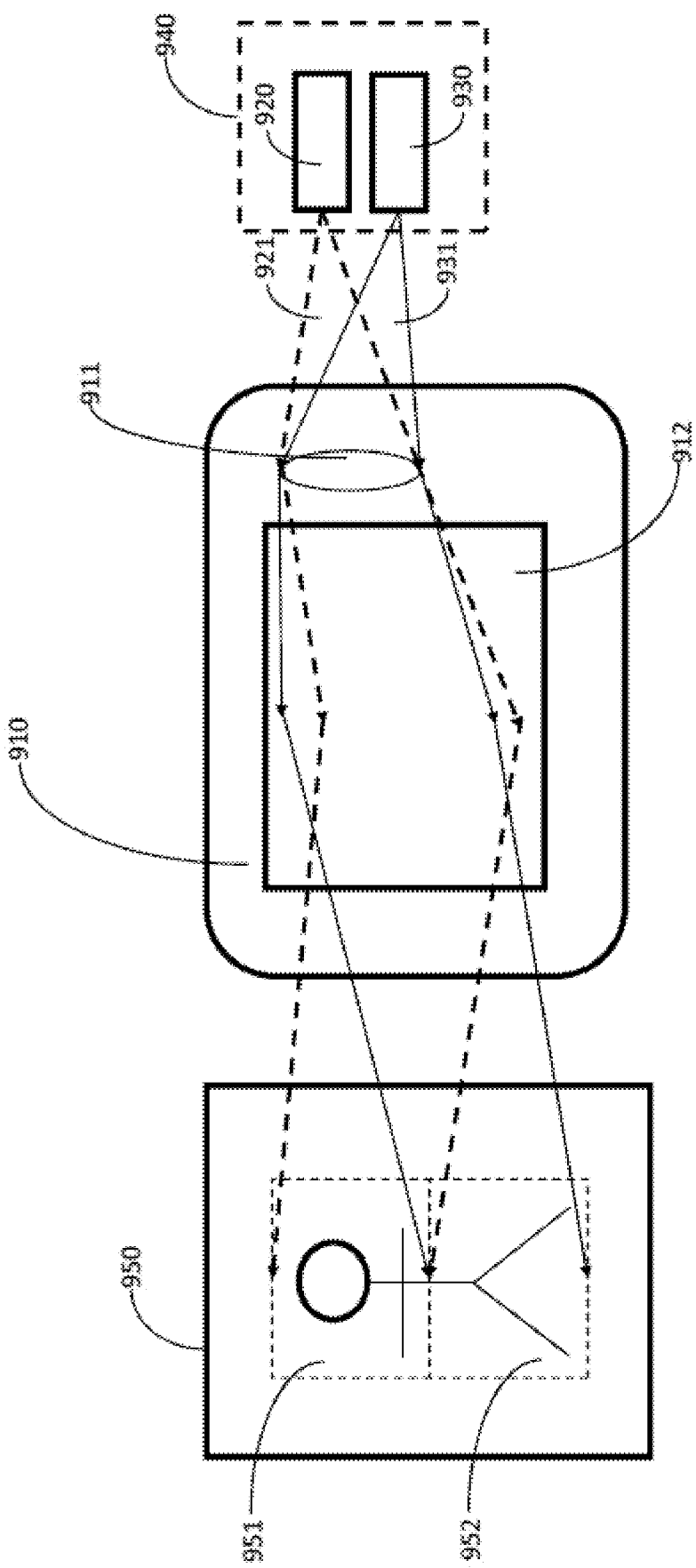
FIG. 9 is a front-elevational view of yet another exemplary light guide based wearable heads-up display ("WHUD") in accordance with the present systems, devices, and methods.

FIG. 9 is a front-elevational view of a light guide based wearable heads-up display ("WHUD") 900 in accordance with the present systems, devices, and methods. Light guide based WHUD 900 comprises light guide 910 and light source 940. Light source 940 comprises first wavelength light source 920 and second wavelength light source 930. First wavelength light source 920 produces light with a wavelength that is either less than or greater than the light produced by second wavelength light source 930. The difference in wavelength between first wavelength light source 920 and second wavelength light source 930 can be smaller than 20 nm, and may be smaller than 2 nm; advantageously, the difference in wavelength between first wavelength light source 920 and second wavelength light source 930 is small enough as to be imperceptible to the human eye.

Light guide 910 comprises incoupler (IC) 911 and outcoupler (OC) 912. Light guide 910 may propagate light within a range of angles, where the minimum angle corresponds to a bounce length equal to the pupil of the eye of the user and the maximum angle is equal to the critical angle for total internal reflection (TIR) within light guide 910. IC 911 comprises a hologram with an angular bandwidth less than the range of angles that may be utilized by light guide 910. The center wavelength of IC 911 is between the wavelengths of first wavelength light source 920 and second wavelength light source 930.

First wavelength light source 920 produces first wavelength light 921. First wavelength light 921 impinges on IC 911 across a first range of angles. The difference in wavelength between first wavelength light 921 and the center wavelength of IC 911 causes a first shift in the center of the angular bandwidth of IC 911; first wavelength light source 920 is positioned and oriented to align the center of the first range of angles with the center of the first shifted angular bandwidth of IC 911.

Second wavelength light source 930 produces second wavelength light 931. First wavelength light 931 impinges on IC 911 across a second range of angles. The difference in wavelength between second wavelength light 931 and the center wavelength of IC 911 causes a second shift in the center of the angular bandwidth of IC 911; second wavelength light source 930 is positioned and oriented to align the center of the second range of angles with the center of the second shifted angular bandwidth of IC 911.

Due to the wavelength-dependent shift in the center of angular bandwidth of IC 911, the total range of angles that impinge on IC 911 by the combination of first wavelength light 921 and second wavelength light 931 is greater than the angular bandwidth of IC 911 at the center wavelength of IC 911.

IC 911 couples first wavelength light 921 into light guide 910 to impinge on OC 912. OC 912 outcouples first wavelength light 921 to form first FOV portion 951. IC 911 couples second wavelength light 931 into light guide 910 to impinge on OC 912. OC 912 outcouples second wavelength light 931 to form second FOV portion 952. First FOV portion 951 and second FOV portion 952 combine to form a single, larger FOV 950.

Contiguous Photopolymer Couplers

A light-guide based wearable heads-up display can utilize diffractive optical elements (DOEs) as the incoupler (IC), exit pupil expander (EPE), and outcoupler (OC). DOEs employed in light-guide based wearable heads-up displays can include surface relief gratings (SRGs) that are etched into the surface of the light-guide material as discrete elements, or are laminated onto the surface of the light guide. As an example, a SRG may be etched into a glass light guide using electron-beam bombardment, therefore the IC, OC, and EPE would each be etched into the surface of the light guide as discrete elements.

Alternatively, the IC, EPE, and OC, may comprise holographic optical elements (HOEs). HOEs are recorded in a holographic recording medium, a non-exclusive example of a holographic recording medium is photopolymer. Hologram recording can be performed by adhering the photopolymer to a flat, transparent surface, recording the hologram, removing the hologram from the flat transparent surface, and then adhering the hologram to the light guide. Each of the IC, OC, and EPE, would then form a separate element that would be attached individually to the light guide, requiring individual alignment of each element.

Figure 10B:
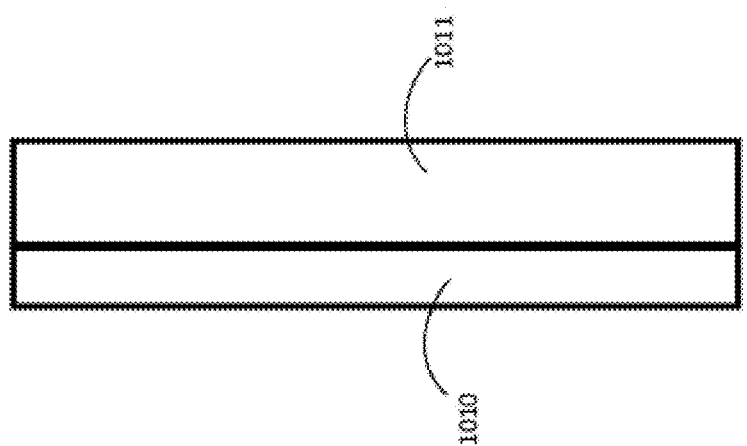
FIG. 10B is a side elevational view of a contiguous photopolymer coupler in accordance with the present systems, designs, and methods.
Figure 10A:
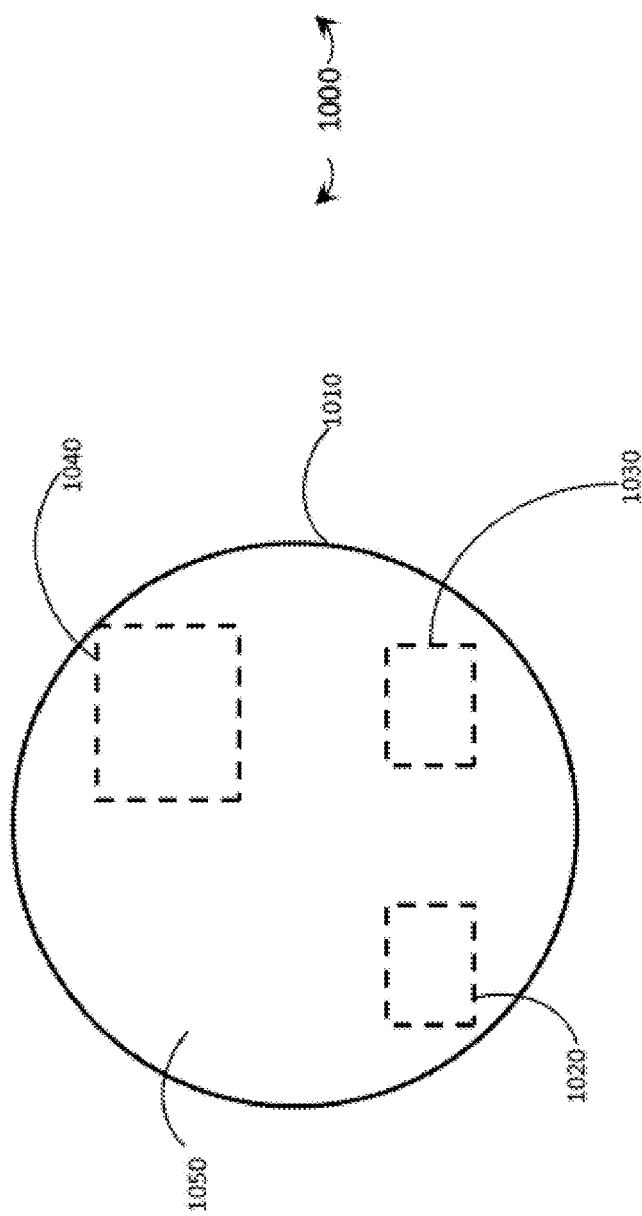
FIG. 10A is a front elevational view of a contiguous photopolymer coupler in accordance with the present systems, designs, and methods.

FIG. 10A is a front elevational view of a contiguous photopolymer coupler 1000 in accordance with the present systems, designs, and methods. FIG. 10B is a side elevational view of a contiguous photopolymer coupler 1000 in accordance with the present systems, designs, and methods. Contiguous photopolymer coupler 1000 comprises photopolymer layer 1010 and light guide layer 1011.

Photopolymer layer 1010 comprises IC 1020, EPE 1030, OC 1040, and unrecorded area 1050. IC 1020, EPE 1030, and OC 1040 each comprise discrete regions of hologram fringes. Unrecorded area 1050 contains no hologram fringes. IC 1020 comprises a HOE positioned and oriented to redirect light from a light source into light guide layer 1011. EPE 1030 comprises a HOE positioned and oriented to replicate light propagating within light guide layer 1011 into multiple exit pupils. OC 1040 comprises a HOE positioned and oriented to outcouple a portion of light propagating within light guide layer 1011, and allow the remainder to continue propagating to replicate additional exit pupils.

Photopolymer layer 1010 is depicted in FIG. 10B as being adjacent to light guide layer 1011. A person of skill in the art will appreciate that photopolymer layer may be embedded within an internal volume of light guide layer 1011. Photopolymer layer 1010 has a first refractive index. Light guide layer 1011 has a second refractive index. The first refractive index may advantageously be equal to the second refractive index, this prevents Fresnel reflections at the interface between photopolymer layer 1010 and light guide layer 1011.

The first refractive index may not be equal to the second refractive index; contiguous photopolymer coupler 1000 may further comprise an antireflective (AR) coating located between photopolymer layer 1010 and light guide layer 1011. The first refractive index may be a gradient refractive index (GRIN), a gradient refractive index is advantageous as it allows a photopolymer material to possess a different refractive index than the light guide material without requiring an AR coating.

A contiguous photopolymer coupler may be manufactured by recording a IC HOE, a EPE HOE, and an OC HOE in different regions of a photoactive photopolymer material. The boundaries of each of the IC, the EPE, and the OC may be defined by employing a mask during the recording of each of the IC, the EPE, and/or the OC. The mask prevents a hologram from being recorded in an undesired area by blocking light from reaching the undesired areas. The unrecorded areas of the photopolymer material may be bleached after recording.

Alternatively, the unrecorded area(s) of the photoactive photopolymer may be selectively bleached by masked bleaching. Selective bleaching may be performed by applying a mask to a photoactive photopolymer material and bleaching the areas of the photopolymer material not covered by the mask.

Each of the IC, the EPE, and the OC may comprise a wavelength-multiplexed hologram. A wavelength-multiplexed hologram may comprise a red/green/blue (RGB) hologram for use in a full-color WHUD. Each of the IC, The EPE, and the OC may comprise an angle-multiplexed hologram.

Recording each of the of the IC, the EPE, and the OC may include recording the IC, the EPE, and the OC in a high-index environment. A high-index environment may include surrounding the photopolymer material with water. Recording each of the IC, the EPE, and the OC may include recording each of the IC, the EPE, and the OC while the photopolymer material is adhered to the light guide material.

Figure 11:
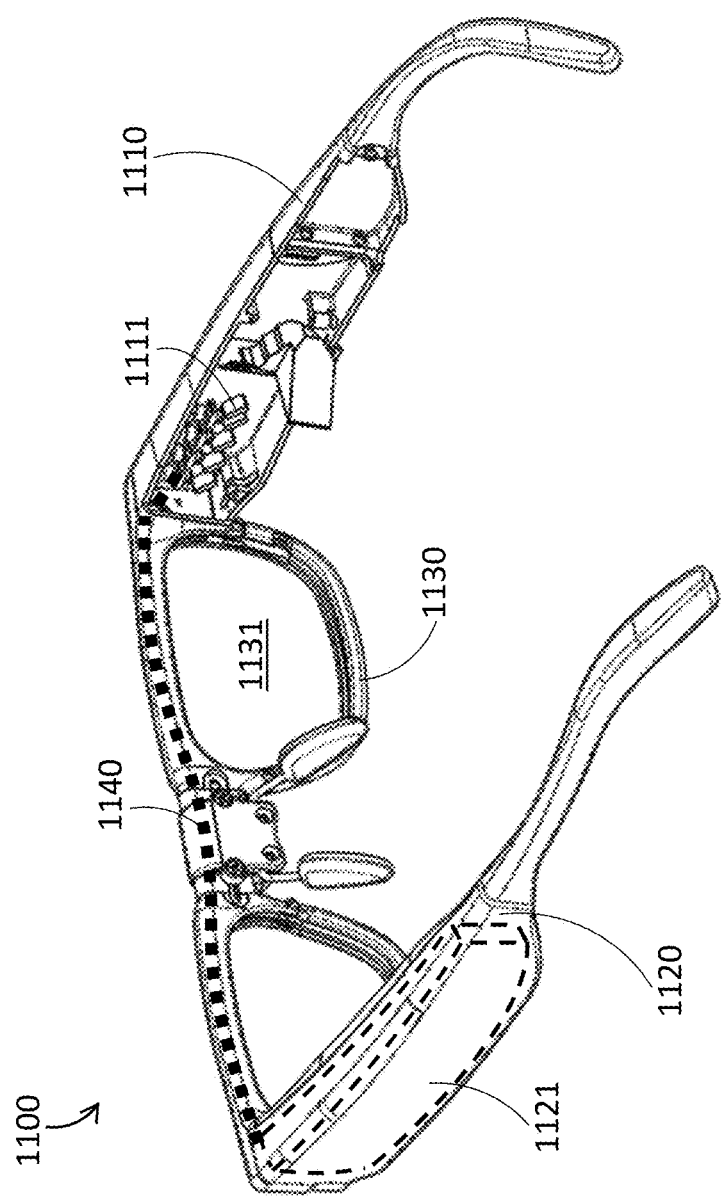
FIG. 11 is a partial-cutaway perspective diagram of an exemplary WHUD in accordance with the present systems, devices, and methods.

FIG. 11 is a partial-cutaway perspective diagram of an exemplary wearable heads-up display ("WHUD") 1100 in accordance with the present systems, devices, and methods. WHUD 1100 includes a first arm 1110, a second arm 1120, and a front frame 1130 which is physically coupled to first arm 1110 and second arm 1120. When worn by a user, first arm 1110 is to be positioned on a first side of a head of the user, second arm 1120 is to be positioned on a second side of a head of a user opposite the first side of the head of the user, and front frame 1130 is to be positioned on a front side of the head of a user.

First arm 1110 carries a light engine assembly 1111 which outputs light representative of display content to be viewed by a user. First arm 1110 may also optionally carry several additional components of WHUD 1100, such as at least one processor, at least one non-transitory processor-readable storage medium, or a power supply circuit, for example. Front frame 1130 carries an optical combiner 1131 in a field of view of the user which receives light output from the light engine assembly 1111 and redirects this light to form a display to be viewed by the user.

In the case of FIG. 11, the display will be a monocular display visible to a right eye of a user. Second arm 1120 as shown in FIG. 11 carries a power source 1121 which powers the components of WHUD 1100. Front frame 1130 also carries at least one set of electrically conductive current paths 1140 which provide electrical coupling between power source 1121 and light engine 1111, and any other electrical components carried by first arm 1110. "Power source" as used herein can refer to a component which provides electrical power. This could include for example a source of stored power such as a battery, including a chemical battery or a mechanical battery, or could include power generation systems such as piezoelectric elements, solar cells, or similar. A "set of electrically conductive current paths" as used herein can refer to a single electrically conductive current path, such as a wire or conductive trace on a printed circuit board, as well as a plurality of electrically conductive current paths, such as a plurality of wires or a plurality of conductive traces on a printed circuit board. Further, for a set of electrically conductive current paths to provide electrical coupling, at least one current path in the set can provide the coupling. It is possible, but not necessary, that a plurality or all of the electrically conductive current paths in the set provide the coupling. Further, for one set of electrically conductive current paths to provide electrical coupling to another set of electrically conductive current paths, at least one current path in the one set should couple to at least one current path in the other set. It is possible, but not necessary, for each electrically conductive current path in the one set to couple to a respective electrically conductive current path in the other set. It is also possible that either of the sets of electrically conductive current paths could act as fan-in or fan-out paths, in which the number of conductors in one set of electrically conductive current paths is greater or less than the number of conductors in the other set of electrically conductive current paths.

Detailed implementations of how such a monocular arrangement can be implemented are discussed in for example U.S. Provisional Patent Application No. 62/862,355. However, such an arrangement is merely exemplary. As another example, the orientation of WHUD 1100 could be reversed, such that the display is presented to a left eye of a user instead of the right eye. As another example, second arm 1120 could carry a light engine assembly similar to light engine assembly 1111 carried by first arm 1110, and front frame 1130 could also carry another optical combiner similar to optical combiner 1131, such that WHUD 1100 presents a binocular display to both a right eye and a left eye of a user.

Light engine assembly 1111 and optical combiner 1131 can include any appropriate display architecture for outputting light and redirecting the light to form a display to be viewed by a user. For example, light engine 1111 could include any of the light sources discussed herein, such as a projector, a scanning laser projector, a microdisplay, a white-light source, or any other display technology as appropriate for a given application. Optical combiner 1131 could include any of the optical combiners or light guides discussed herein. Optical combiner 1131 could itself be a light guide as discussed herein, or optical combiner 1131 could carry a light guide as discussed herein. Optical combiner 1131 could include a lens, and the lens can be carried by front frame 1130. As examples, optical combiner 1131 could include a light guide which is: a layer formed as part of a lens, a layer adhered to a lens, a layer embedded within a lens, a layer sandwiched between at least two lenses, or any other appropriate arrangement. Such a layer can for example be molded or cast, and/or could include a thin film and/or coating. Further, a "lens" as used herein can refer to a plano lens which applies no optical power and does not correct a user's vision, or a "lens" can be a prescription lens which applies an optical power to incoming light to correct a user's vision.

The term "light engine" as used herein is not limited to referring to a singular light source, but can also refer to a plurality of light sources, and can also refer to a "light engine assembly". A light engine assembly may include some components which enable the light engine to function, or which improve operation of the light engine. As one example, a light engine assembly could include at least one light source, such as a laser or a plurality of lasers. The light engine assembly may additionally include electrical components such as driver circuitry to power the at least one light source. The light engine assembly may additionally include optical components such as collimation lenses, a beam combiner, or beam shaping optics. The light engine assembly may additionally include beam redirection optics such as least one MEMS mirror, which can be operated to scan light from at least one laser light source such as in a scanning laser projector. In the above example, the light engine assembly includes not only a light source, but also components which take the output from at least one light source and produce conditioned display light. All of the components in the light engine assembly can be included in a housing of the light engine assembly, could be affixed to a substrate of the light engine assembly such as a printed circuit board or similar, or could be separately mounted components of a WHUD.

The term "optical combiner" as used herein can also refer to an "optical combiner assembly". An optical combiner assembly may include additional components which support or enable functionality of the optical combiner. As one example, a waveguide combiner may be very thin, and consequently very fragile. To this end, it may be desirable to position the waveguide combiner within or on a transparent carrier, such as a lens. An optical combiner assembly could be a package which includes the transparent carrier and the waveguide positioned therein or thereon. As another example, an optical combiner assembly could include a prescription component, which applies an optical power to incoming light to compensate for imperfect user eyesight. Such a prescription component could include curvature applied to a transparent carrier itself, or could include a component additional to the transparent carrier, such as a clip-in or add-on lens.

Figure 12:
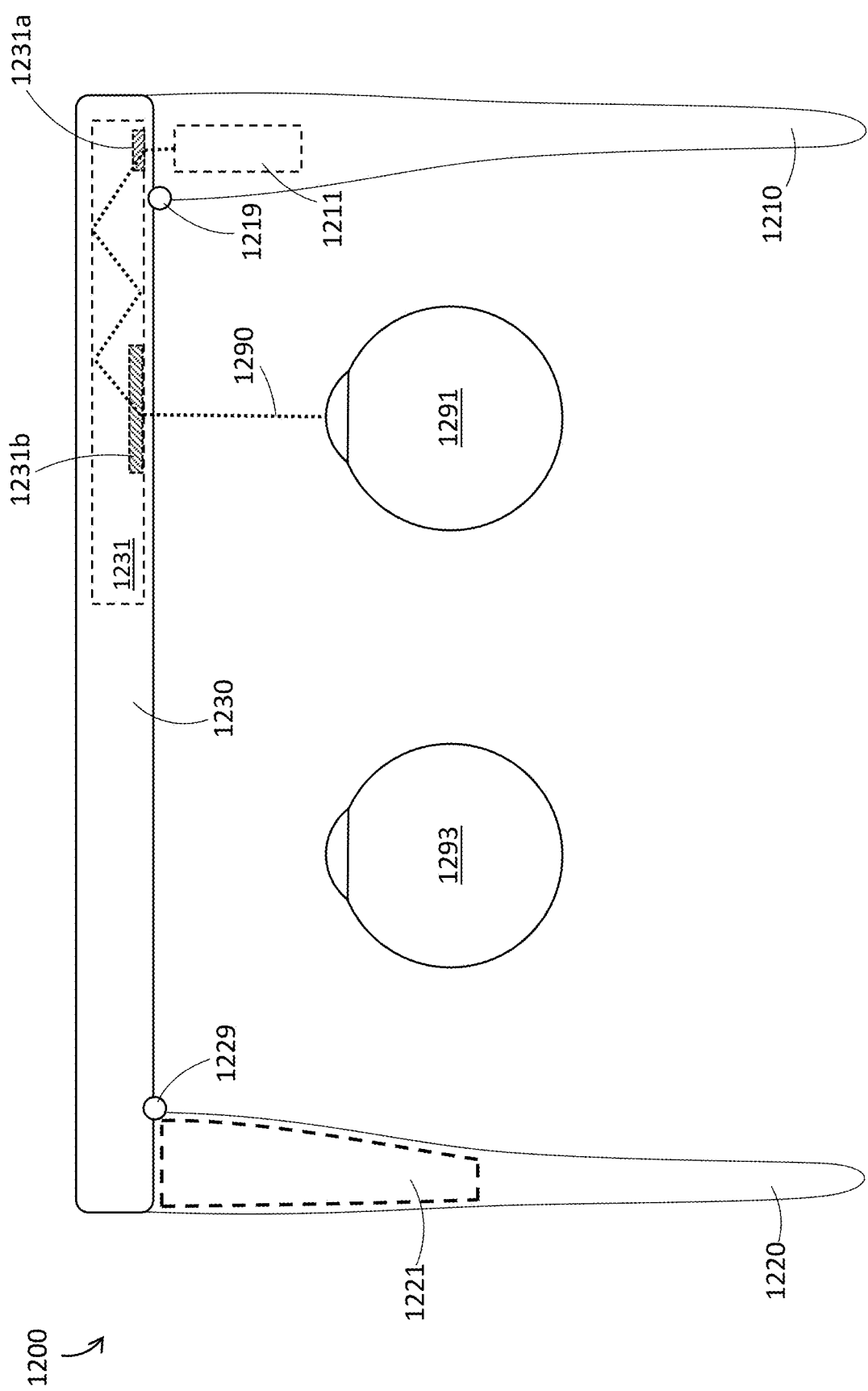
FIG. 12 is a top cutaway view of an exemplary WHUD in accordance with the present systems, devices, and methods.

FIG. 12 is a top cutaway view of an exemplary WHUD 1200 in accordance with the present systems, devices, and methods. Similar to WHUD 1100, WHUD 1200 includes a first arm 1210, a second arm 1220, and a front frame 1230. First arm 1210 is coupled to front frame 1230 by hinge 1219, which allows first arm 1210 to rotate relative to front frame 1230. Second arm 1220 is coupled to front frame 1230 by hinge 1229, which allows second arm 1220 to rotate relative to front frame 1230. FIG. 12 illustrates WHUD 1200 in an unfolded configuration, in which first arm 1210 and second arm 1220 are rotated such that WHUD 1200 can be worn on a head of a user, with first arm 1210 positioned on a first side of the head of the user, second arm 1220 positioned on a second side of the head of the user opposite the first side, and front frame 1230 positioned on a front of the head of the user. First arm 1210 and second arm 1220 can be rotated towards front frame 1230, such that WHUD 1200 can be in a more compact shape when not in use.

In FIG. 12, first arm 1210 carries light engine assembly 1211. Second arm 1220 carries power source 1221. Front frame 1230 carries optical combiner 1231 and at least one set of electrically conductive current paths (not illustrated to avoid clutter). The terms "carry", "carries" or similar used herein do not necessarily dictate that one component physically supports another component. For example, it is stated above that first arm 1210 carries light engine assembly 1211. This could mean that light engine assembly 1211 is mounted to or within first arm 1210 such that first arm 1210 physically supports light engine assembly 1211. However, it could also describe a direct or indirect coupling relationship, even when first arm 1210 is not necessarily physically supporting light engine assembly 1211. As an example, in some implementations such as those disclosed in U.S. Provisional Patent Application No. 62/890,269, a hinge of a WHUD can support both an arm of the WHUD and a light engine of the WHUD, with no direct supporting relationship between the light engine and the first arm. This can be true of any of the component relationships described herein where one component "carries" another.

The at least one set of electrically conductive current paths provide electrical coupling between power source 1221 and electrical components carried by first arm 1210, such as light engine assembly 1211. Such electrical coupling could be provided indirectly, such as through a power supply circuit, or could be provided directly from power source 1221 to each electrical component in first arm 1210. Detailed implementations for the electrically conductive current paths mentioned herein can be found in at least U.S. Provisional Patent Application No. 62/862,355.

Light engine assembly 1211 can output display light 1290 representative of display content to be viewed by a user. Display light 1290 can be redirected by an optical combiner 1231 towards an eye 1291 of the user, such that the user can see the display content. In the case of WHUD 1200, optical combiner 1231 is a waveguide combiner which includes an incoupler 1231a and an outcoupler 1231b. Display light 1290 from light engine assembly 1211 impinges on incoupler 1231a and is redirected into waveguide combiner 1231, where the display light 1290 is guided through the waveguide by total internal reflection. Subsequently, display light 1290 in waveguide combiner 1231 impinges on outcoupler 1231b, which redirects display light 1290 out of the waveguide and towards an eye 1291 of a user.

WHUD 1200, as well as any other WHUD discussed herein, can include at least one processor communicatively coupled to each of the electrical components in WHUD 1200, including but not limited to light engine 1211. The at least one processor can be any suitable component which can execute instructions or logic, including but not limited to a micro-controller, microprocessor, multi-core processor, integrated-circuit, ASIC, FPGA, programmable logic device, or any appropriate combination of these components. Further, WHUD 1200, as well as any other WHUD discussed herein, can include at least one non-transitory processor-readable storage medium which may store processor readable instructions thereon, which when executed by at least one processor can cause the at least one processor to execute any number of functions, including causing light engine 1211 to output light 1290 representative of display content to be viewed by a user, receiving user input, managing user interfaces, generating display content to be presented to a user, receiving and managing data from any sensors carried by WHUD 1200, receiving and processing external data and messages, and/or any other functions as appropriate for a given application. The at least one non-transitory processor-readable storage medium can be any suitable component which can store instructions, logic, or programs, including but not limited to non-volatile or volatile memory, read only memory (ROM), random access memory (RAM), FLASH memory, registers, magnetic hard disk, optical disk, or any combination of these components.

Several exemplary WHUDs, optical combiners, and light guides are described herein. One skilled in the art will appreciate that the specific features described in the implementations herein can be combined as appropriate, such that the present disclosure is not restricted to only the implementations discussed herein, but also includes any reasonable combination of the features of the implementations discussed herein.

A person of skill in the art will appreciate that the various embodiments for aligning a lens in a laser projector described herein may be applied in non-WHUD applications. For example, the present systems, devices, and methods may be applied in non-wearable heads-up displays and/or in other applications that may or may not include a visible display.

In some implementations, one or more optical fiber(s) may be used to guide light signals along some of the paths illustrated herein.

The WHUDs described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No. 14/155,087, U.S. Non-Provisional patent application Ser. No. 14/155,107, PCT Patent Application PCT/US2014/057029, and/or U.S. Provisional Patent Application Ser. No. 62/236,060, all of which are incorporated by reference herein in their entirety.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the following are hereby incorporated by reference herein in their entirety: U.S. Provisional Patent Application No. 62/791,514, U.S. Provisional Patent Application No. 62/846,979, U.S. Provisional Patent Application No. 62/904,742, U.S. Provisional Patent Application No. 62/910,124, U.S. Provisional Patent Application No. 62/943,381, U.S. Provisional Patent Application No. 62/946,705, U.S. patent application Ser. No. 16/737,255, U.S. Patent Application Publication No. US 2016-0238845 A1, US Patent Application Publication No. 2017-0068095, U.S. Provisional Patent Application Ser. No. 62/534,099, U.S. Provisional Patent Application Ser. No. 62/565,677, U.S. Provisional Patent Application Ser. No. 62/525,601, U.S. Provisional Patent Application Ser. No. 62/557,551, U.S. Provisional Patent Application Ser. No. 62/557,554, U.S. Provisional Patent Application Ser. No. 62/573,978, U.S. Provisional Patent Application Ser. No. US 62/680,449, U.S. Provisional Patent Application Ser. No. US 62/702,657, U.S. Non-Provisional patent application Ser. No. 16/057,432, U.S. Provisional Patent Application Ser. No. US 62/734,798, U.S. Provisional Patent Application Ser. No. 62/755,206, U.S. Non-Provisional patent application Ser. No. 16/204,842, U.S. Provisional Patent Application No. 62/862,355, U.S. Provisional Patent Application No. 62/890,269, U.S. Non-Provisional patent application Ser. No. 14/155,087, U.S. Non-Provisional patent application Ser. No. 14/155,107, PCT Patent Application PCT/US2014/057029, and U.S. Provisional Patent Application Ser. No. 62/236,060. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An optical combiner comprising:
   a first grating to receive light and to redirect the light towards an eye of a user; and
   a second grating immediately adjacent the first grating, the second grating having a lower optical influence than the first grating.

2. The optical combiner of claim 1 wherein the second grating surrounds the first grating.

3. The optical combiner of claim 1, further comprising a light guide which carries the first grating and the second grating, the light guide to receive light and to direct the received light to impinge on the first grating.

4. The optical combiner of claim 1 wherein the first grating and the second grating are surface relief gratings.

5. The optical combiner of claim 1 wherein the first grating and the second grating are holographic gratings.

6. The optical combiner of claim 1, wherein the first grating has a higher grating efficiency than the second grating.

7. The optical combiner of claim 1, further comprising a third grating immediately adjacent the second grating, the third grating having a lower optical influence than the second grating.

8. The optical combiner of claim 1 wherein the first grating has a grating angle which is different from a grating angle of the second grating.

9. The optical combiner of claim 1 wherein the second grating has a grating efficiency which decreases proportionally to distance from the first grating according to a gradient.

10. The optical combiner of claim 1 wherein the second grating covers an entire visible area of the optical combiner except for an area covered by the first grating.

11. The optical combiner of claim 1, further comprising a third grating and a fourth grating adjacent the third grating, the third grating to receive light and redirect the received light towards the first grating, and the fourth grating having a lower optical influence than the third grating.

12. A wearable heads-up display (WHUD) comprising:
   a light source to output display light; and
   an optical combiner comprising:
      a first grating to receive display light and to redirect the received display light towards an eye of a user; and
      a second grating immediately adjacent the first grating, the second grating having a lower optical influence than the first grating.

13. The WHUD of claim 12, the optical combiner further comprising:
 a third grating;
 a fourth grating immediately adjacent the third grating, the fourth grating having a lower optical influence than the third grating; and
 a fifth grating,
 wherein the fifth grating is to receive display light from the light source and redirect the display light from the light source towards the third grating, the third grating is to receive display light from the fifth grating and redirect the display light from the fifth grating towards the first grating, and the first grating is to receive display light from the third grating and redirect the display light from the third grating towards an eye of a user.

14. The WHUD of claim 12, further comprising a support structure which includes a first arm, a second arm, and a front frame coupled to the first arm and the second arm, wherein the light source is carried by the first arm and the optical combiner is carried by the front frame.

15. The WHUD of claim 12, the optical combiner further comprising a light guide which carries the first grating and the second grating, the light guide to receive display light and to direct the received display light to impinge on the first grating.

16. The WHUD of claim 12, the optical combiner further comprising a third grating immediately adjacent the second grating, the third grating having a lower optical influence than the second grating.

17. The WHUD of claim 12 wherein the first grating has a grating angle which is different from a grating angle of the second grating.

18. The WHUD of claim 12 wherein the second grating has a grating efficiency which decreases proportionally to distance from the first grating according to a gradient.

19. The WHUD of claim 12 wherein the second grating covers an entire visible area of the optical combiner except for an area covered by the first grating.

20. The WHUD of claim 12, wherein the first grating has a higher grating efficiency than the second grating.

* * * * *